United States Patent
Johansson et al.

(10) Patent No.: US 12,410,349 B2
(45) Date of Patent: *Sep. 9, 2025

(54) AQUEOUS BINDER COMPOSITION

(71) Applicant: ROCKWOOL INTERNATIONAL A/S, Hedehusene (DK)

(72) Inventors: Dorte Bartnik Johansson, Roskilde (DK); Ib Johannsen, Aarhus (DK); Bjørn Sjøgren Kilsgaard, Aarhus C (DK); Miroslav Nikolic, Aarhus C (DK)

(73) Assignee: Rockwool A/S, Hedehusene (DK)

( * ) Notice: Subject to any disclaimer, the term of this patent is extended or adjusted under 35 U.S.C. 154(b) by 343 days.

This patent is subject to a terminal disclaimer.

(21) Appl. No.: 17/282,128

(22) PCT Filed: Oct. 7, 2019

(86) PCT No.: PCT/EP2019/077123
§ 371 (c)(1),
(2) Date: Apr. 1, 2021

(87) PCT Pub. No.: WO2020/070337
PCT Pub. Date: Apr. 9, 2020

(65) Prior Publication Data
US 2022/0106508 A1  Apr. 7, 2022

(30) Foreign Application Priority Data
Oct. 5, 2018  (EP) .................................. 18198999

(51) Int. Cl.
C09J 197/00  (2006.01)
C03C 25/25  (2018.01)
(Continued)

(52) U.S. Cl.
CPC ........... C09J 197/005 (2013.01); C03C 25/25 (2018.01); C03C 25/328 (2013.01); C03C 25/36 (2013.01);
(Continued)

(58) Field of Classification Search
CPC .... C09J 197/005; C03C 25/25; C03C 25/328; C03C 25/36; D04H 1/4209; D04H 1/587; D04H 1/64
See application file for complete search history.

(56) References Cited

U.S. PATENT DOCUMENTS 3,093,604 A  6/1963 Ayers
3,227,667 A  1/1966 Moffitt et al.
(Continued)

FOREIGN PATENT DOCUMENTS

CN  107286873 A  * 10/2017
CN  107459385 A  12/2017
(Continued)

OTHER PUBLICATIONS

English Machine Translation of CN107286873 ( A ) obtained on Nov. 1, 2023 https://worldwide.espacenet.com/publicationDetails/biblio?CC=CN&NR=107286873A&KC=A&FT=D&ND=3&date=20171024&DB=EPODOC&locale=en_EP (Year: 2017).*
(Continued)

Primary Examiner — Ling Siu Choi
Assistant Examiner — Olga Lucia Donahue
(74) Attorney, Agent, or Firm — Abel Schillinger, LLP

(57) ABSTRACT

The invention is directed to an aqueous binder composition for mineral fibers.

28 Claims, 6 Drawing Sheets

(51) Int. Cl.
  C03C 25/328  (2018.01)
  C03C 25/36  (2006.01)
  C07G 1/00  (2011.01)
  D04H 1/4209  (2012.01)
  D04H 1/587  (2012.01)
  D04H 1/64  (2012.01)

(52) U.S. Cl.
  CPC ............ *C07G 1/00* (2013.01); *D04H 1/4209* (2013.01); *D04H 1/587* (2013.01); *D04H 1/64* (2013.01)

(56) References Cited

U.S. PATENT DOCUMENTS

| | | | |
|---|---|---|---|
| 3,285,801 | A | 11/1966 | Sarjeant |
| 5,318,990 | A | 6/1994 | Strauss |
| 6,238,475 | B1 | 5/2001 | Gargulak et al. |
| 6,706,853 | B1 | 3/2004 | Stanssens et al. |
| 6,818,699 | B2 | 11/2004 | Kajimaru et al. |
| 7,265,169 | B2 | 9/2007 | Li et al. |
| 2004/0034154 | A1 | 2/2004 | Tutin et al. |
| 2007/0077837 | A1* | 4/2007 | Lundquist ............... C08L 23/02 442/157 |
| 2007/0173588 | A1 | 7/2007 | Espiard et al. |
| 2009/0098387 | A1 | 4/2009 | Brady et al. |
| 2009/0169867 | A1 | 7/2009 | Kelly |
| 2010/0069533 | A1 | 3/2010 | Brady et al. |
| 2010/0112242 | A1 | 5/2010 | Medoff |
| 2011/0054154 | A1* | 3/2011 | Park ........................ C07G 1/00 530/507 |
| 2011/0086567 | A1 | 4/2011 | Hawkins et al. |
| 2011/0159768 | A1 | 6/2011 | Crescimanno et al. |
| 2013/0065012 | A1* | 3/2013 | Parker et al. .......... C09J 189/00 106/155.21 |
| 2014/0030540 | A1 | 1/2014 | Valkonen |
| 2014/0163142 | A1 | 6/2014 | Zhang et al. |
| 2016/0168435 | A1* | 6/2016 | Amen-Chen ........ C08G 18/302 524/378 |
| 2016/0244364 | A1 | 8/2016 | Kalliola et al. |
| 2018/0312625 | A1 | 11/2018 | Phanopoulos et al. |
| 2019/0136062 | A1 | 5/2019 | Alvarado et al. |
| 2019/0338168 | A1 | 11/2019 | Laine et al. |
| 2019/0390374 | A1 | 12/2019 | Fournier et al. |

FOREIGN PATENT DOCUMENTS

| | | | | |
|---|---|---|---|---|
| CN | 107556946 | A * | 1/2018 | ............ C09J 105/16 |
| EP | 0583086 | A | 2/1994 | |
| EP | 0990727 | A1 | 4/2000 | |
| EP | 1741726 | A1 | 1/2007 | |
| EP | 3299421 | A1 | 3/2018 | |
| JP | 2014065779 | A | 4/2014 | |
| RU | 2345112 | C2 | 1/2009 | |
| WO | 9831763 | A1 | 7/1998 | |
| WO | 9936368 | A1 | 7/1999 | |
| WO | 0105725 | A1 | 1/2001 | |
| WO | 0196460 | A2 | 12/2001 | |
| WO | 0206178 | A1 | 1/2002 | |
| WO | 2004007615 | A1 | 1/2004 | |
| WO | 2006061249 | A1 | 6/2006 | |
| WO | 2008023032 | A1 | 2/2008 | |
| WO | 2008073186 | A2 | 6/2008 | |
| WO | 2011042610 | A1 | 4/2011 | |
| WO | 2012113058 | A1 | 8/2012 | |
| WO | 2012136894 | A1 | 10/2012 | |
| WO | 2014080033 | A1 | 5/2014 | |
| WO | 2015049424 | A1 | 4/2015 | |
| WO | 2016009054 | A1 | 1/2016 | |
| WO | 2017067769 | A1 | 4/2017 | |
| WO | 2017188874 | A1 | 11/2017 | |
| WO | 2018122470 | A1 | 7/2018 | |
| WO | 2018138450 | A1 | 8/2018 | |

OTHER PUBLICATIONS

English Machine Translation of CN107556946 ( A ) obtained on Nov. 7, 2023 https://worldwide.espacenet.com/publicationDetails/biblio?ll=0&ND=3&adjacent=true&locale=en_EP&FT=D&date=20180109&CC=CN&NR=107556946A&KC=A (Year: 2018).*

English Machine Translation of EP3299421 ( A1 ) obtained on Nov. 7, 2023 https://worldwide.espacenet.com/publicationDetails/description?CC=EP&NR=3299421A1&KC=A1&FT=D&ND=3&date=20180328&DB=EPODOC&locale=en_EP (Year: 2018).*

Chen et al. (Journal of applied Polymer Science, vol. 42, 2073-2079 (1991)) (Year: 1991).*

Bouajila et al., "Some Laws of Lignin Plasticization", Journal of Applied Polymer Science, vol. 102, 2006, pp. 1445-1451.

Urkhanova et al., "Fiber-reinforced concrete with mineral fibers and nanosilica", Procedia Engineering 195 (Jul. 20, 2017), pp. 147-154.

Xiangwei Zhu et al., "Bio-Based Wood Adhesive from Camelina Protein (a Biodiesel Residue) and Depolymerized Lignin with Improved Water Resistance", ACS Omega, (Nov. 16, 2017), vol. 2, No. 11, ISSN 2470-1343, pp. 7996-8004.

Richard J.A. Gosselink et al., "Effect of periodate on lignin for wood adhesive application", Holzforschung: International Journal of the Biology, Chemistry, Physics and Technology of Wood, DE, (Jan. 1, 2011), vol. 65, No. 2, ISSN 0018-3830, pp. 155-162.

Venla Hemmila et al., "Lignin: an adhesive raw material of the future or waste of research energy?", Northern European Network for Wood Science and Engineering (WSE), (Jan. 1, 2013), pp. 98-103.

Masoumeh Ghorbani et al., "Ammoxidized Fenton-Activated Pine Kraft Lignin Accelerates Synthesis and Curing of Resole Resins", Polymers, (Jan. 28, 2017), vol. 9, No. 12, p. 43, p. 54, p. 55.

Dietrich Meier et al., "Conversion of technical lignins into slow-release nitrogenous fertilizers by ammoxidation in liquid phase", Bioresource Technology, (Jan. 1, 1994), pp. 121-128.

U.S. Appl. No. 17/282,126, filed Apr. 1, 2021.
U.S. Appl. No. 17/282,130, filed Apr. 1, 2021.
U.S. Appl. No. 17/282,131, filed Apr. 1, 2021.

"Properties of Hydrogen Peroxide", Editorial board of «Inorganic Chemistry», «Inorganic Chemistry vol. II», Peoples Education Press, 1st Edition, 2nd Print, Oct. 1978, pp. 82-83 (CN).

Tsuneo Koike, "Progress in Development of Epoxy Resin Systems Based on Wood Biomass in Japan", Polymer Engineering and Science, 2012, 701-717.

Ajinkya More, "A review of lignin hydrogen peroxide oxidation chemistry with emphasis on aromatic aldehyde and acids", Lignin hydrogen peroxide oxidation chemistry, published Mar. 17, 2021.

"Chemoselective Metal-Free Aerobic Alcohol Oxidation in Lignin", J. Am. Chem. Soc. 2013, 135, pp. 6415-6418.

* cited by examiner

Fig. 4

Properties of technical lignins

| Lignin Type | Sulfur Lignins | | Sulfur-free lignins | |
| --- | --- | --- | --- | --- |
| | Kraft | Lignosulfate | Soda | Organosolv |
| Raw materials | Softwood Hardwood | Softwood Hardwood | Annual plants | Softwood Hardwood Annual Plants |
| Solubility | Alkali Organic solvents | Water | Alkali | Wide range of organic solvents |
| Number-average molar mass ($M_a$-gmol$^{-1}$) | 1000-3000 | 15,000-50,000 | 800-3000 | 500-5000 |
| Polydispersity | 2.5-3.5 | 6-8 | 2.5-3.5 | 1.5-2.5 |
| $T_g$(°C) | 140-150 | 130 | 140 | 90-110 |

*Adhesive Lap Joint Shear Strength Test Specimen*

AQUEOUS BINDER COMPOSITION

FIELD OF THE INVENTION

The present invention relates to an aqueous binder composition for mineral fibres, a method for producing a bonded mineral fibre product using said binder, and a mineral fibre product comprising mineral fibres in contact with a cured binder.

BACKGROUND OF THE INVENTION

Mineral fibre products generally comprise man-made vitreous fibres (MMVF) such as, e.g., glass fibres, ceramic fibres, basalt fibres, slag wool, mineral wool and stone wool, which are bonded together by a cured thermoset polymeric binder material. For use as thermal or acoustical insulation products, bonded mineral fibre mats are generally produced by converting a melt made of suitable raw materials to fibres in conventional manner, for instance by a spinning cup process or by a cascade rotor process. The fibres are blown into a forming chamber and, while airborne and while still hot, are sprayed with a binder solution and randomly deposited as a mat or web onto a traveling conveyor. The fibre mat is then transferred to a curing oven where heated air is blown through the mat to cure the binder and rigidly bond the mineral fibres together.

In the past, the binder resins of choice have been phenol-formaldehyde resins which can be economically produced and can be extended with urea prior to use as a binder. However, the existing and proposed legislation directed to the lowering or elimination of formaldehyde emissions have led to the development of formaldehyde-free binders such as, for instance, the binder compositions based on polycarboxy polymers and polyols or polyamines, such as disclosed in EP-A-583086, EP-A-990727, EP-A-1741726, U.S. Pat. No. 5,318,990 and US-A-2007/0173588.

Another group of non-phenol-formaldehyde binders are the addition/-elimination reaction products of aliphatic and/or aromatic anhydrides with alkanolamines, e.g., as disclosed in WO 99/36368, WO 01/05725, WO 01/96460, WO 02/06178, WO 2004/007615 and WO 2006/061249. These binder compositions are water soluble and exhibit excellent binding properties in terms of curing speed and curing density. WO 2008/023032 discloses urea-modified binders of that type which provide mineral wool products having reduced moisture take-up.

Since some of the starting materials used in the production of these binders are rather expensive chemicals, there is an ongoing need to provide formaldehyde-free binders which are economically produced.

A further effect in connection with previously known aqueous binder compositions from mineral fibres is that at least the majority of the starting materials used for the productions of these binders stem from fossil fuels. There is an ongoing trend of consumers to prefer products that are fully or at least partly produced from renewable materials and there is therefore a need to provide binders for mineral wool which are, at least partly, produced from renewable materials.

A further effect in connection with previously known aqueous binder compositions for mineral fibres is that they involve components which are corrosive and/or harmful. This requires protective measures for the machinery involved in the production of mineral wool products to prevent corrosion and also requires safety measures for the persons handling this machinery. This leads to increased costs and health issues and there is therefore a need to provide binder compositions for mineral fibres with a reduced content of corrosive and/or harmful materials.

In the meantime, a number of binders for mineral fibres have been provided, which are to a large extend based on renewable starting materials. In many cases these binder based to a large extent on renewable resources are also formaldehyde-free.

However, many of these binders are still comparatively expensive because they are based on comparatively expensive basic materials.

SUMMARY OF THE INVENTION

Accordingly, it was an object of the present invention to provide a binder composition which is particularly suitable for bonding mineral fibres, uses renewable materials as starting materials, reduces or eliminates corrosive and/or harmful materials, and is comparatively inexpensive to produce.

A further object of the present invention was to provide a mineral wool product bonded with such a binder composition.

A further object of the present invention was to provide a method of making such a mineral wool product.

In accordance with a first aspect of the present invention, there is provided a, preferably formaldehyde-free, comprising:

a component (i) in form of one or more oxidized lignins;

a component (ii) in form of one or more cross-linkers;

a component (iii) in form of one or more plasticizers.

In accordance with a second aspect of the present invention, there is provided a method of producing a bonded mineral fiber product which comprises the step of contacting the mineral fibers with the aqueous binder composition described above.

In accordance with a third aspect of the present invention, there is provided a mineral wool product, comprising mineral fibres in contact with the cured binder composition according to the present invention.

BRIEF DESCRIPTION OF THE DRAWINGS

In the drawings,

FIG. 4 shows a summary of the properties of technical lignins;

The present inventors have surprisingly found that it is possible to obtain a mineral wool product comprising mineral fibres bound by a binder resulting from the curing of a binder composition, whereby the binder composition can be produced from inexpensive renewable materials to a large degree, does not contain, or contains only to a minor degree, any corrosive and/or harmful agents.

DESCRIPTION OF THE PREFERRED EMBODIMENTS

The aqueous binder composition for mineral fibres according to the present invention comprises
a component (i) in form of one or more oxidized lignins;
a component (ii) in form of one or more cross-linkers;
a component (iii) in form of one or more plasticizers.

In a preferred embodiment, the binders according to the present invention are formaldehyde free.

For the purpose of the present application, the term "formaldehyde free" is defined to characterize a mineral wool product where the emission is below 5 μg/m$^2$/h of formaldehyde from the mineral wool product, preferably below 3 μg/m$^2$/h. Preferably, the test is carried out in accordance with ISO 16000 for testing aldehyde emissions.

Component (i)

Component (i) is in form of one or more oxidized lignins.

Lignin, cellulose and hemicellulose are the three main organic compounds in a plant cell wall. Lignin can be thought of as the glue, that holds the cellulose fibers together. Lignin contains both hydrophilic and hydrophobic groups. It is the second most abundant natural polymer in the world, second only to cellulose, and is estimated to represent as much as 20-30% of the total carbon contained in the biomass, which is more than 1 billion tons globally.

Figure 1:
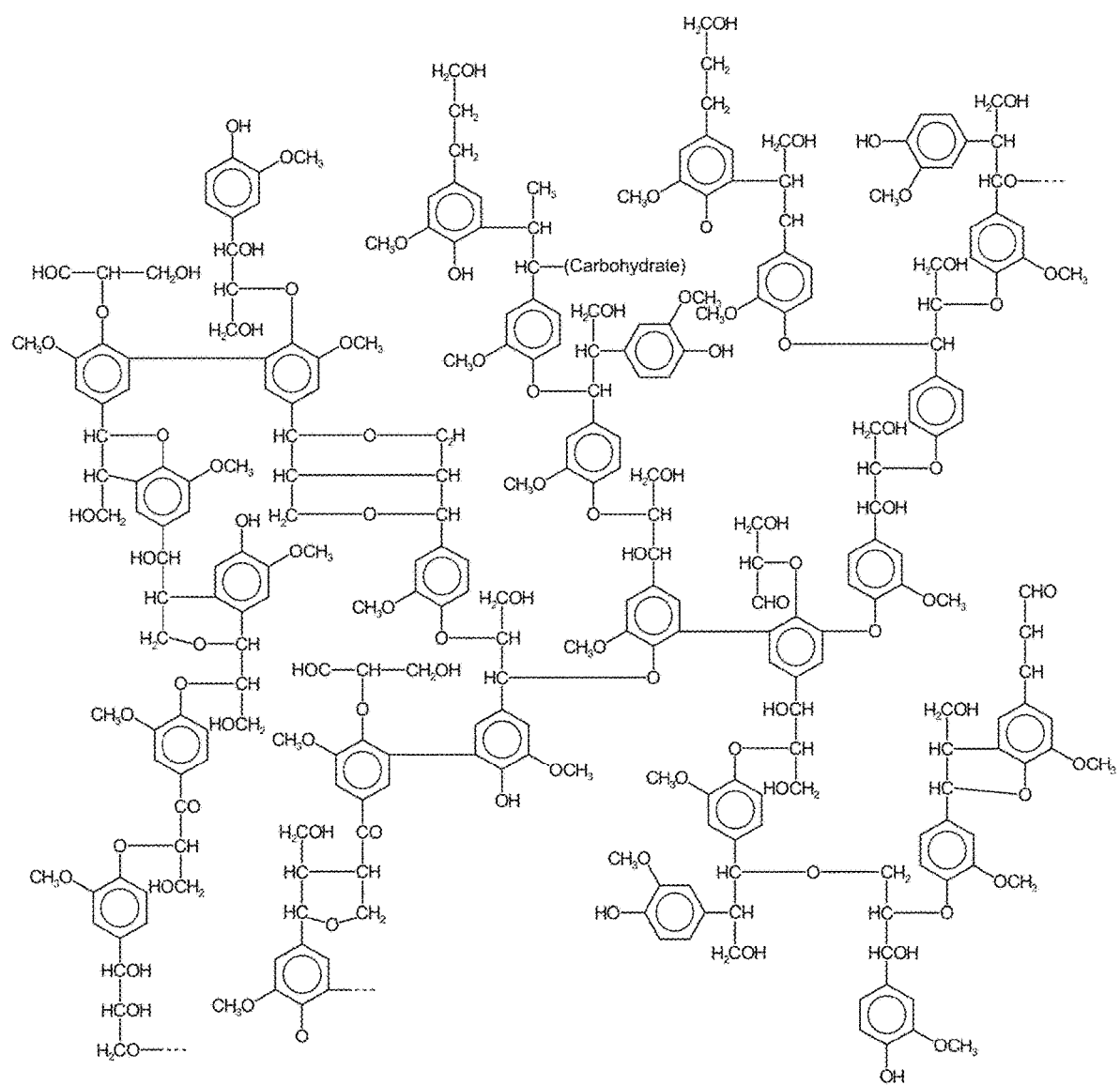
FIG. 1 shows a section from a possible lignin structure.

FIG. 1 shows a section from a possible lignin structure.

Figure 2:
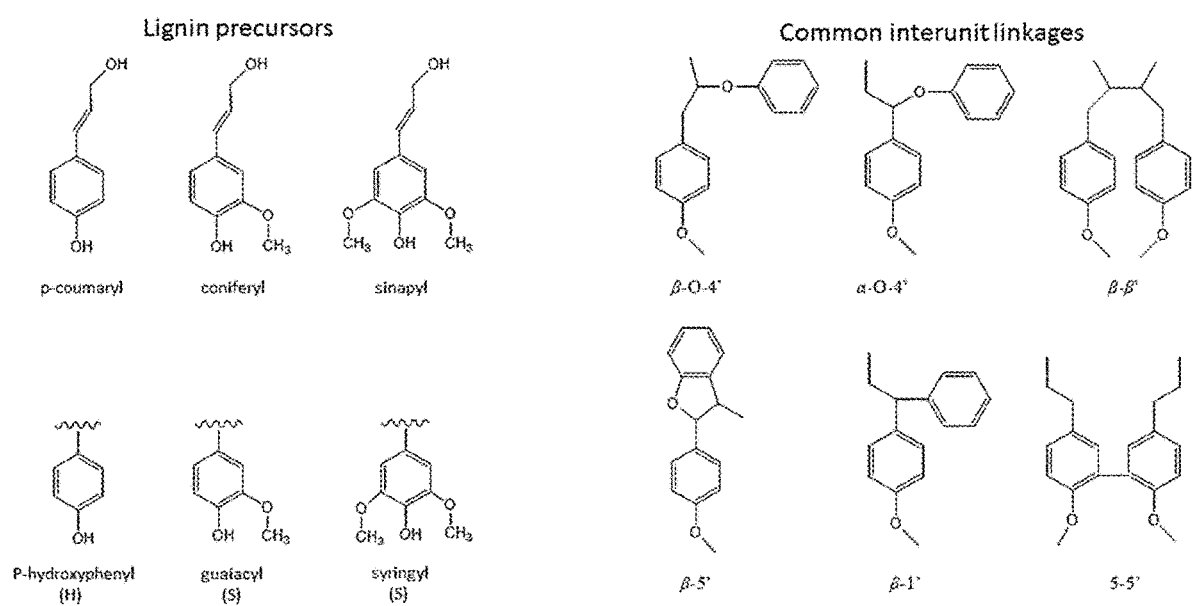
FIG. 2 shows structures of lignin precursors and common interunit linkages.
Figure 3:
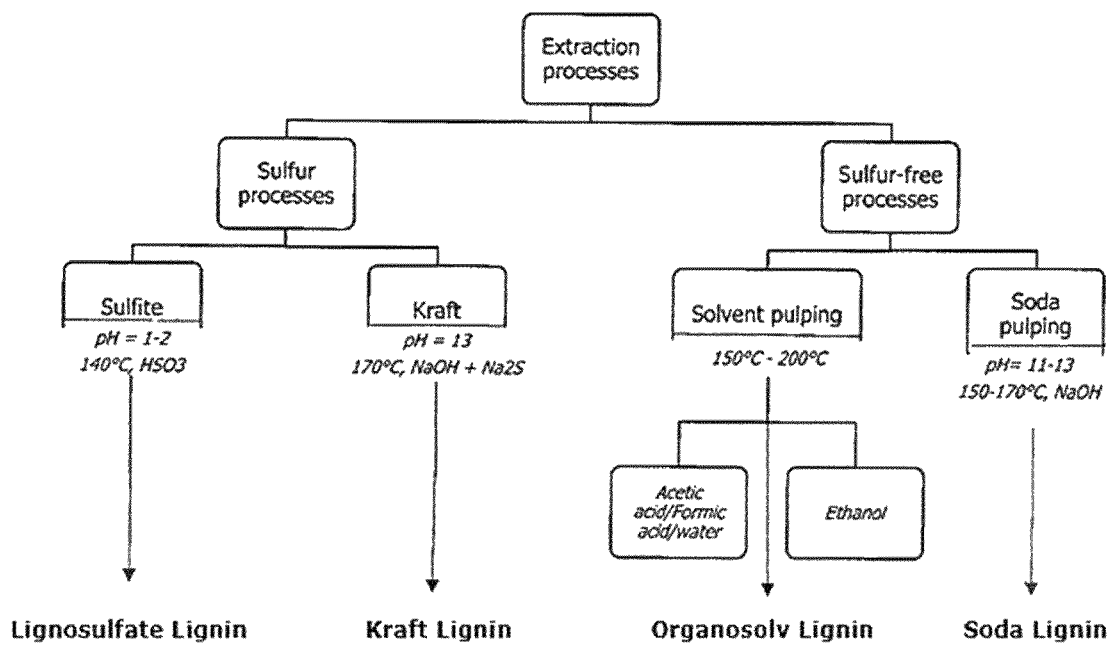
FIG. 3 shows four groups of technical lignins available on the market and the ways in which they are obtained.

There are at least four groups of technical lignins available in the market. These four groups are shown in FIG. 3. A possible fifth group, Biorefinery lignin, is a bit different as it is not described by the extraction process, but instead by the process origin, e.g. biorefining and it can thus be similar or different to any of the other groups mentioned. Each group is different from each other and each is suitable for different applications. Lignin is a complex, heterogenous material composed of up to three different phenyl propane monomers, depending on the source. Softwood lignins are made mostly with units of coniferyl alcohol, see FIG. 2 and as a result, they are more homogeneous than hardwood lignins, which has a higher content of syringyl alcohol, see FIG. 2. The appearance and consistency of lignin are quite variable and highly contingent on process.

A summary of the properties of these technical lignins is shown in FIG. 4.

Lignosulfonate from the sulfite pulping process remains the largest commercial available source of lignin, with capacity of 1.4 million tonnes. But taking these aside, the kraft process is currently the most used pulping process and is gradually replacing the sulfite process. An estimated 78 million tonnes per year of lignin are globally generated by kraft pulp production but most of it is burned for steam and energy. Current capacity for kraft recovery is estimated at 160,000 tonnes, but sources indicate that current recovery is only about 75,000 tonnes. Kraft lignin is developed from black liquor, the spent liquor from the sulfate or kraft process. At the moment, 3 well-known processes are used to produce the kraft lignin: LignoBoost, LignoForce and SLRP. These 3 processes are similar in that they involve the addition of $CO_2$ to reduce the pH to 9-10, followed by acidification to reduce pH further to approximately 2. The final step involves some combination of washing, leaching and filtration to remove ash and other contaminants. The three processes are in various stages of commercialization globally.

The kraft process introduces thiol groups, stilbene while some carbohydrate remain. Sodium sulphate is also present as an impurity due to precipitation of lignin from liquor with sulphuric acid but can potentially be avoided by altering the way lignin is isolated. The kraft process leads to high amount of phenolic hydroxyl groups and this lignin is soluble in water when these groups are ionized (above pH~10).

Commercial kraft lignin is generally higher in purity than lignosulfonates. The molecular weight are 1000-3000 g/mol.

Soda lignin originates from sodium hydroxide pulping processes, which are mainly used for wheat straw, bagasse and flax. Soda lignin properties are similar to kraft lignins one in terms of solubility and $T_g$. This process does not utilize sulphur and there is no covalently bound sulphur. The ash level is very low. Soda lignin has a low solubility in neutral and acid media but is completely soluble at pH 12 and higher.

The lignosulfonate process introduces large amount of sulphonate groups making the lignin soluble in water but also in acidic water solutions. Lignosulfonates has up to 8% sulfur as sulphonate, whereas kraft lignin has 1-2% sulfur, mostly bonded to the lignin. The molecular weight of lignosulfonate is 15.000-50.000 g/mol. This lignin contains more leftover carbohydrates compared to other types and has a higher average molecular weight. The typical hydrophobic core of lignin together with large number of ionized sulphonate groups make this lignin attractive as a surfactant and it often finds application in dispersing cement etc.

A further group of lignins becoming available is lignins resulting from biorefining processes in which the carbohydrates are separated from the lignin by chemical or biochemical processes to produce a carbohydrate rich fraction. This remaining lignin is referred to as biorefinery lignin. Biorefineries focus on producing energy, and producing substitutes for products obtained from fossil fuels and petrochemicals as well as lignin. The lignin from this process is in general considered a low value product or even a waste product mainly used for thermal combustion or used as low grade fodder or otherwise disposed of.

Organosolv lignin availability is still considered on the pilot scale. The process involves extraction of lignin by using water together with various organic solvents (most often ethanol) and some organic acids. An advantage of this process is the higher purity of the obtained lignin but at a much higher cost compared to other technical lignins and with the solubility in organic solvents and not in water.

Previous attempts to use lignin as a basic compound for binder compositions for mineral fibres failed because it proved difficult to find suitable cross-linkers which would achieve desirable mechanical properties of the cured mineral wool product and at the same time avoid harmful and/or corrosive components. Presently lignin is used to replace oil derived chemicals, such as phenol in phenolic resins in binder applications or in bitumen. It is also used as cement and concrete additives and in some aspects as dispersants.

The cross-linking of a polymer in general should provide improved properties like mechanical, chemical and thermal resistance etc. Lignin is especially abundant in phenolic and aliphatic hydroxyl groups that can be reacted leading to cross-linked structure of lignin. Different lignins will also have other functional groups available that can potentially be used. The existence of these other groups is largely dependent on the way lignin was separated from cellulose and hemicellulose (thiols in kraft lignin, sulfonates in lignosulfonate etc.) depending on the source.

The cross-linking potential of hydroxyl groups is relatively limited. Lignin is of course very reactive to isocyanates and can build polyurethanes. However, polyurethanes are of lesser interest due to toxicity of isocyanates. Similarly, phenolic hydroxyls can react in ring opening with epoxides and participate in standard epoxy/amine curing, but again epoxides are of lesser interest due to toxicity. Phenolic hydroxyls activate the aromatic rings to react in standard phenolic resins using aldehydes as cross-linkers, but again this is of lesser interest due to the toxicity of aldehydes. For example, it is well-known to cross-link lignins with aldehydes, see EP3299421 A1 disclosing a binder comprising lignin, glutaraldehyde, ammonia, glucose and lysine. Several examples of lignin binders comprising formaldehyde are also known, such as WO14080033 and U.S. Pat. No. 3,227,667.

The present inventors have surprisingly found that by using oxidized lignins, binder compositions for mineral fibres can be prepared which allow excellent properties of the mineral fibre product produced therewith and at the same time do not require harmful and/or corrosive components to be included into the binder compositions.

In one embodiment, the component (i) is in form of one or more oxidized kraft lignins.

In one embodiment, the component (i) is in form of one or more oxidized soda lignins.

In one embodiment, the component (i) is in form of one or more ammonia-oxidized lignins. For the purpose of the present invention, the term "ammonia-oxidized lignins" is to be understood as a lignin that has been oxidized by an oxidation agent in the presence of ammonia. The term "ammonia-oxidized lignin" is abbreviated as AOL.

In an alternative embodiment, the ammonia is partially or fully replaced by an alkali metal hydroxide, in particular sodium hydroxide and/or potassium hydroxide.

A typical oxidation agent used for preparing the oxidized lignins is hydrogen peroxide.

In one embodiment, the ammonia-oxidized lignin comprises one or more of the compounds selected from the group of ammonia, amines, hydroxides or any salts thereof.

In one embodiment, the component (i) is having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i).

In one embodiment, the component (i) is having an average carboxylic acid group content of more than 1.5 groups per macromolecule of component (i), such as more than 2 groups, such as more than 2.5 groups.

Without wanting to be bound by any particular theory, the present inventors believe that the carboxylic acid group content of the oxidized lignins plays an important role in the surprising advantages of the aqueous binder compositions for mineral fibres according to the present invention. In particular, the present inventors believe that the carboxylic acid group of the oxidized lignins improve the cross-linking properties and therefore allow better mechanical properties of the cured mineral fibre products.

Component (ii)

Component (ii) is in form of one or more cross-linkers.

The component (ii) is in one embodiment in form of one or more cross-linkers selected from β-hydroxyalkylamide-cross-linkers and/or oxazoline-cross-linkers.

β-hydroxyalkylamide-cross-linkers is a curing agent for the acid-functional macromolecules. It provides a hard, durable, corrosion resistant and solvent resistant cross-linked polymer network. It is believed the β-hydroxyalkylamide-cross-linkers cure through esterification reaction to form multiple ester linkages. The hydroxy functionality of the β-hydroxyalkylamide-cross-linkers should be an average of at least 2, preferably greater than 2 and more preferably 2-4 in order to obtain optimum curing response.

Oxazoline group containing cross-linkers are polymers containing one of more oxazoline groups in each molecule and generally, oxazoline containing cross-linkers can easily be obtained by polymerizing an oxazoline derivative. The U.S. Pat. No. 6,818,699 B2 provides a disclosure for such a process.

In one embodiment, the component (ii) is one or more cross-linkers selected from the group consisting of multifunctional organic amines such as an alkanolamine, diamines, such as hexamethyldiamine, triamines.

In one embodiment, the component (ii) is an epoxidised oil based on fatty acid triglyceride.

It is noted that epoxidised oils based on fatty acid triglycerides are not considered hazardous and therefore the use of these compounds in the binder compositions according to the present invention do not render these compositions unsafe to handle.

In one embodiment, the component (ii) is a molecule having 3 or more epoxy groups.

In one embodiment, the component (ii) is one or more flexible oligomer or polymer, such as a low $T_g$ acrylic based polymer, such as a low $T_g$ vinyl based polymer, such as low $T_g$ polyether, which contains reactive functional groups such as carbodiimide groups, such as anhydride groups, such as oxazoline groups, such as amino groups, such as epoxy groups.

In one embodiment, component (ii) is selected from the group consisting of cross-linkers taking part in a curing reaction, such as hydroxyalkylamide, alkanolamine, a reaction product of an alkanolamine and a polycarboxylic acid. The reaction product of an alkanolamine and a polycarboxylic acid can be found in U.S. Pat. No. 6,706,853B1.

Without wanting to be bound by any particular theory, the present inventors believe that the very advantageous properties of the aqueous binder compositions according to the present invention are due to the interaction of the oxidized lignins used as component (i) and the cross-linkers mentioned above. It is believed that the presence of carboxylic acid groups in the oxidized lignins enable the very effective cross-linking of the oxidized lignins. It is a further advantageous effect that the β-hydroxyalkylamide-cross-linkers and oxazoline-cross-linkers which are preferably used as cross-linkers in the aqueous binder composition according to the present invention are non-harmful, in particular non-toxic and non-corrosive. These cross-linkers interact very effectively with the oxidized lignins containing increased amounts of carboxylic acid groups, thereby enabling the advantageous mechanical properties of the mineral fibre products according to the present invention.

In one embodiment, the binder composition according to the present invention comprises component (ii) in an amount of 1 to 40 wt.-%, such as 4 to 20 wt.-%, such as 6 to 12 wt.-%, based on the dry weight of component (i).

Component (iii)

Component (iii) is in form of one or more plasticizers.

It has surprisingly been found that the inclusion of plasticizers in the aqueous binder compositions according to the present invention strongly improves the mechanical properties of the mineral fibre products according to the present invention.

The term plasticizer refers to a substance that is added to a material in order to make the material softer, more flexible (by decreasing the glass-transition temperature $T_g$) and easier to process.

In one embodiment, component (iii) is in form of one or more plasticizers selected from the group consisting of polyethylene glycols, polyethylene glycol ethers, polyethers, hydrogenated sugars, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups.

In one embodiment, component (iii) is in form of one or more plasticizers selected from the group consisting of carbonates, such as ethylene carbonate, propylene carbonate, lactones, lactams, lactides, compounds with a structure similar to lignin like vanilin, acetosyringone, solvents used as coalescing agents like alcohol ethers, polyvinyl alcohol.

In one embodiment, component (iii) is in form of one or more non-reactive plasticizer selected from the group consisting of polyethylene glycols, polyethylene glycol ethers, polyethers, hydrogenated sugars, phthalates and/or other esters, solvents used as coalescing agents like alcohol ethers, acrylic polymers, polyvinyl alcohol.

In one embodiment, component (iii) is one or more reactive plasticizers selected from the group consisting of carbonates, such as ethylene carbonate, propylene carbonate, lactones, lactams, lactides, di- or tricarboxylic acids, such as adipic acid, or lactic acid, and/or vanillic acid and/or ferullic acid, polyurethane dispersions, acrylic based polymers with free carboxy groups, compounds with a structure similar to lignin like vanilin, acetosyringone.

In one embodiment, component (iii) is in form of one or more plasticizers selected from the group consisting of polyethylene glycols, polyethylene glycol ethers.

Another particular surprising aspect of the present invention is that the use of plasticizers like polyethylene glycols and polyethylene glycol ethers having a boiling point of more than 100° C., in particular 140 to 250° C., strongly improves the mechanical properties of the mineral fibre products according to the present invention although, in view of their boiling point, it is likely that these plasticizers will at least in part evaporate during the curing of the aqueous binders in contact with the mineral fibres.

In one embodiment, component (iii) is in form of one or more plasticizers having a boiling point of more than 100° C., such as 110 to 280° C., more preferred 120 to 260° C., more preferred 140 to 250° C.

Without wanting to be bound by any particular theory, the present inventors believe that the effectiveness of these plasticizers in the aqueous binder composition according to the present invention is associated with the effect of increasing the mobility of the oxidized lignins during the curing process whereby at the same time they evaporate in the course of this curing process. It is believed that the increased mobility of the lignins or oxidized lignins during the curing process facilitates the effective cross-linking. A further advantage of this aspect is that almost no plasticizer is present in the cured mineral fibre product so that no side effect hereof; e.g., water absorption or change of mechanical properties with aging are present in the cured mineral fibre product.

In one embodiment, component (iii) is in form of one or more polyethylene glycols having an average molecular weight of 150 to 50000 g/mol, in particular 150 to 4000 g/mol, more particular 150 to 1000 g/mol, preferably 150 to 500 g/mol, more preferably 200 to 400 g/mol.

In one embodiment, component (iii) is in form of one or more polyethylene glycols having an average molecular weight of 4000 to 25000 g/mol, in particular 4000 to 15000 g/mol, more particular 8000 to 12000 g/mol.

In one embodiment component (iii) is capable of forming covalent bonds with component (i) and/or component (ii) during the curing process. Such a component would not evaporate and remain as part of the composition but will be effectively altered to not introduce unwanted side effects e.g. water absorption in the cured product. Non-limiting examples of such a component are caprolactone and acrylic based polymers with free carboxyl groups.

In one embodiment, component (iii) is present in an amount of 0.5 to 50, preferably 2.5 to 25, more preferably 3 to 15 wt.-%, based on the dry weight of component (i).

Aqueous Binder Composition for Mineral Fibers Comprising Components (i) and (iia)

In one embodiment the present invention is directed to an aqueous binder composition for mineral fibers comprising:
a component (i) in form of one or more oxidized lignins;
a component (iia) in form of one or more modifiers.

The present inventors have found that the excellent binder properties can also be achieved by a two-component system which comprises component (i) in form of one or more oxidized lignins and a component (iia) in form of one or more modifiers, and optionally any of the other components mentioned above and below.

In a preferred embodiment, component (iia) is a modifier in form of one or more compounds selected from the group consisting of epoxidised oils based on fatty acid triglycerides.

In one embodiment, component (iia) is a modifier in form of one or more compounds selected from molecules having 3 or more epoxy groups.

In one embodiment, component (iia) is a modifier in form of one or more flexible oligomer or polymer, such as a low $T_g$ acrylic based polymer, such as a low $T_g$ vinyl based polymer, such as low $T_g$ polyether, which contains reactive functional groups such as carbodiimide groups, such as anhydride groups, such as oxazoline groups, such as amino groups, such as epoxy groups.

Without wanting to be bound by any particular theory, the present inventors believe that the excellent binder properties achieved by the binder composition for mineral fibers comprising components (i) and (iia), and optional further components, are at least partly due to the effect that the modifiers used as components (iia) at least partly serve the function of a plasticizer and a cross-linker.

In one embodiment, the aqueous binder composition comprises component (iia) in an amount of 1 to 40 wt.-%, such as 4 to 20 wt.-%, such as 6 to 12 wt.-%, based on the dry weight of the component (i).

Further Components

In some embodiments, the aqueous binder composition according to the present invention comprises further components.

In one embodiment, the aqueous binder composition according to the present invention comprises a catalyst selected from inorganic acids, such as sulfuric acid, sulfamic acid, nitric acid, boric acid, hypophosphorous acid, and/or phosphoric acid, and/or any salts thereof such as sodium hypophosphite, and/or ammonium salts, such as ammonium salts of sulfuric acid, sulfamic acid, nitric acid, boric acid, hypophosphorous acid, and/or phosphoric acid. The presence of such a catalyst can improve the curing properties of the aqueous binder compositions according to the present invention.

In one embodiment, the aqueous binder composition according to the present invention comprises a catalyst selected from Lewis acids, which can accept an electron pair from a donor compound forming a Lewis adduct, such as $ZnCl_2$, $Mg(ClO_4)_2$, $Sn[N(SO_2\text{-n-}C_8F_{17})_2]_4$.

In one embodiment, the aqueous binder composition according to the present invention comprises a catalyst selected from metal chlorides, such as KCl, $MgCl_2$, $ZnCl_2$, $FeCl_3$ and $SnCl_2$.

In one embodiment, the aqueous binder composition according to the present invention comprises a catalyst selected from organometallic compounds, such as titanate-based catalysts and stannum based catalysts.

In one embodiment, the aqueous binder composition according to the present invention comprises a catalyst selected from chelating agents, such as transition metals, such as iron ions, chromium ions, manganese ions, copper ions.

In one embodiment, the aqueous binder composition according to the present invention further comprises a further component (iv) in form of one or more silanes.

In one embodiment, the aqueous binder composition according to the present invention comprises a further component (iv) in form of one or more coupling agents, such as organofunctional silanes.

In one embodiment, component (iv) is selected from group consisting of organofunctional silanes, such as primary or secondary amino functionalized silanes, epoxy functionalized silanes, such as polymeric or oligomeric epoxy functionalized silanes, methacrylate functionalized silanes, alkyl and aryl functionalized silanes, urea funtionalised silanes or vinyl functionalized silanes.

In one embodiment, the aqueous binder composition according to the present invention further comprises a component (v) in form of one or more components selected from the group of ammonia, amines or any salts thereof.

The present inventors have found that the inclusion of ammonia, amines or any salts thereof as a further component can in particular be useful when oxidized lignins are used in component (i), which oxidised lignin have not been oxidized in the presence of ammonia.

In one embodiment, the aqueous binder composition according to the present invention further comprises a further component in form of urea, in particular in an amount of 5 to 40 wt.-%, such as 10 to 30 wt.-%, 15 to 25 wt.-%, based on the dry weight of component (i).

In one embodiment, the aqueous binder composition according to the present invention further comprises a further component in form of one or more carbohydrates selected from the group consisting of sucrose, reducing sugars, in particular dextrose, polycarbohydrates, and mixtures thereof, preferably dextrins and maltodextrins, more preferably glucose syrups, and more preferably glucose syrups with a dextrose equivalent value of DE=30 to less than 100, such as DE=60 to less than 100, such as DE=60-99, such as DE=85-99, such as DE=95-99.

In one embodiment, the aqueous binder composition according to the present invention further comprises a further component in form of one or more carbohydrates selected from the group consisting of sucrose and reducing sugars in an amount of 5 to 50 wt.-%, such as 5 to less than 50 wt.-%, such as 10 to 40 wt.-%, such as 15 to 30 wt.-% based on the dry weight of component (i).

In the context of the present invention, a binder composition having a sugar content of 50 wt.-% or more, based on the total dry weight of the binder components, is considered to be a sugar based binder. In the context of the present invention, a binder composition having a sugar content of less than 50 wt.-%, based on the total dry weight of the binder components, is considered a non-sugar based binder.

In one embodiment, the aqueous adhesive composition according to the present invention further comprises a further component in form of one or more surface active agents that are in the form of non-ionic and/or ionic emulsifiers such as polyoxyethylene (4) lauryl ether, such as soy lechitin, such as sodium dodecyl sulfate.

In one embodiment, the aqueous binder composition according to the present invention comprises
   a component (i) in form of one or more ammonia-oxidized lignins having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i);
   a component (ii) in form of one or more cross-linkers selected from β-hydroxyalkylamide-cross-linkers and/or oxazoline-cross-linkers and/or is one or more cross-linkers selected from the group consisting of multifunctional organic amines such as an alkanolamine, diamines, such as hexamethyldiamine, triamines;
   a component (iii) in form of one or more polyethylene glycols having an average molecular weight of 150 to 50000 g/mol, in particular 150 to 4000 g/mol, more particular 150 to 1000 g/mol, preferably 150 to 500 g/mol, more preferably 150 to 300 g/mol, or one or more polyethylene glycols having an average molecular weight of 4000 to 25000 g/mol, in particular 4000 to 15000 g/mol, more particular 8000 to 12000 g/mol; wherein preferably the aqueous binder composition comprises component (ii) in an amount of 1 to 40 wt.-%, such as 4 to 20 wt.-%, 6 to 12 wt.-%, based on the dry weight of component (i), and (iii) is present in an amount of 0.5 to 50, preferably 2.5 to 25, more preferably 3 to 15 wt.-%, based on the dry weight of component (i).

In one embodiment, the aqueous binder composition according to the present invention comprises
   a component (i) in form of one or more ammonia-oxidized lignins having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i);
   a component (iia) in form of one or more modifiers selected from epoxidised oils based on fatty acid triglycerides.

In one embodiment, the aqueous binder composition according to the present invention comprises
   a component (i) in form of one or more ammonia-oxidized lignins having an average carboxylic acid group content of more than 1.5 groups per macromolecule of component (i), such as more than 2 groups, such as more than 2.5 groups;
   a component (ii) in form of one or more cross-linkers selected from β-hydroxyalkylamide-cross-linkers and/or oxazoline-cross-linkers and/or is one or more cross-linkers selected from the group consisting of multifunctional organic amines such as an alkanolamine, diamines, such as hexamethyldiamine, triamines;
   a component (iii) in form of one or more polyethylene glycols having an average molecular weight of 150 to 50000 g/mol, in particular 150 to 4000 g/mol, more particular 150 to 1000 g/mol, preferably 150 to 500 g/mol, more preferably 150 to 300 g/mol, or one or more polyethylene glycols having an average molecular weight of 4000 to 25000 g/mol, in particular 4000 to 15000 g/mol, more particular 8000 to 12000 g/mol; wherein preferably the aqueous binder composition comprises component (ii) in an amount of 1 to 40 wt.-%, such as 4 to 20 wt.-%, 6 to 12 wt.-%, based on the dry weight of component (i), and (iii) is present in an amount of 0.5 to 50, preferably 2.5 to 25, more preferably 3 to 15 wt.-%, based on the dry weight of component (i).

In one embodiment, the aqueous binder composition according to the present invention comprises
- a component (i) in form of one or more ammonia-oxidized lignins having an average carboxylic acid group content of more than 1.5 groups per macromolecule of component (i), such as more than 2 groups, such as more than 2.5 groups;
- a component (iia) in form of one or more modifiers selected from epoxidised oils based on fatty acid triglycerides.

In one embodiment, the aqueous binder composition according to the present invention consists essentially of
- a component (i) in form of one or more oxidized lignins;
- a component (ii) in form of one or more cross-linkers;
- a component (iii) in form of one or more plasticizers;
- a component (iv) in form of one or more coupling agents, such as organofunctional silanes;
- optionally a component in form of one or more compounds selected from the group of ammonia, amines or any salts thereof;
- optionally a component in form of urea;
- optionally a component in form of a more reactive or non-reactive silicones;
- optionally a hydrocarbon oil;
- optionally one or more surface active agents;
- water.

In one embodiment, the aqueous binder composition according to the present invention consists essentially of
- a component (i) in form of one or more oxidized lignins;
- a component (iia) in form of one or more modifiers selected from epoxidised oils based on fatty acid triglycerides;
- a component (iv) in form of one or more coupling agents, such as organofunctional silanes;
- optionally a component in form of one or more compounds selected from the group of ammonia, amines or any salts thereof;
- optionally a component in form of urea;
- optionally a component in form of a more reactive or non-reactive silicones;
- optionally a hydrocarbon oil;
- optionally one or more surface active agents;
- water.

A Method for Producing a Mineral Fibre Product

The present invention also provides a method for producing a mineral fibre product by binding mineral fibres with the binder composition.

Accordingly, the present invention is also directed to a method for producing a mineral fibre product which comprises the steps of contacting mineral fibres with a binder composition comprising
- a component (i) in form of one or more oxidized lignins;
- a component (ii) in form of one or more cross-linkers;
- a component (iii) in form of one or more plasticizers.

Curing

The web is cured by a chemical and/or physical reaction of the binder components.

In one embodiment, the curing takes place in a curing device.

In one embodiment, the curing is carried out at temperatures from 100 to 300° C., such as 170 to 270° C., such as 180 to 250° C., such as 190 to 230° C.

In one embodiment, the curing takes place in a conventional curing oven for mineral wool production operating at a temperature of from 150 to 300° C., such as 170 to 270° C., such as 180 to 250° C., such as 190 to 230° C.

In one embodiment, the curing takes place for a time of 30 seconds to 20 minutes, such as 1 to 15 minutes, such as 2 to 10 minutes.

In a typical embodiment, curing takes place at a temperature of 150 to 250° C. for a time of 30 seconds to 20 minutes.

The curing process may commence immediately after application of the binder to the fibres. The curing is defined as a process whereby the binder composition undergoes a physical and/or chemical reaction which in case of a chemical reaction usually increases the molecular weight of the compounds in the binder composition and thereby increases the viscosity of the binder composition, usually until the binder composition reaches a solid state.

In a one embodiment, the curing of the binder in contact with the mineral fibers takes place in a heat press.

The curing of a binder in contact with the mineral fibers in a heat press has the particular advantage that it enables the production of high-density products.

In one embodiment the curing process comprises drying by pressure. The pressure may be applied by blowing air or gas through/over the mixture of mineral fibres and binder.

Mineral Fibre Product According to the Present Invention

The present invention is also directed to a mineral fibre product comprising mineral fibres in contact with a cured binder composition as described above, i.e. in contact with a cured binder resulting from the curing of the aqueous binder composition described above.

The mineral fibres employed may be any of man-made vitreous fibres (MMVF), glass fibres, ceramic fibres, basalt fibres, slag fibres, rock fibres, stone fibres and others. These fibres may be present as a wool product, e.g. like a stone wool product.

Suitable fibre formation methods and subsequent production steps for manufacturing the mineral fibre product are those conventional in the art. Generally, the binder is sprayed immediately after fibrillation of the mineral melt on to the air-borne mineral fibres. The aqueous binder composition is normally applied in an amount of 0.1 to 18%, preferably 0.2 to 8% by weight, of the bonded mineral fibre product on a dry basis.

The spray-coated mineral fibre web is generally cured in a curing oven by means of a hot air stream. The hot air stream may be introduced into the mineral fibre web from below, or above or from alternating directions in distinctive zones in the length direction of the curing oven.

Typically, the curing oven is operated at a temperature of from about 150° C. to about 300° C., such as 170 to 270° C., such as 180 to 250° C., such as 190 to 230° C. Generally, the curing oven residence time is from 30 seconds to 20 minutes, such as 1 to 15 minutes, such as 2 to 10 minutes, depending on, for instance, the product density.

In a typical embodiment, the mineral fiber product according to the present invention is cured at a temperature of 150° C. to 250° C. for a time of 30 seconds to 20 minutes.

If desired, the mineral wool web may be subjected to a shaping process before curing. The bonded mineral fibre product emerging from the curing oven may be cut to a desired format e.g., in the form of a batt. Thus, the mineral fibre products produced, for instance, have the form of woven and nonwoven fabrics, mats, batts, slabs, sheets, plates, strips, rolls, granulates and other shaped articles which find use, for example, as thermal or acoustical insulation materials, vibration damping, construction materials, facade insulation, reinforcing materials for roofing or flooring applications, as filter stock and in other applications.

In accordance with the present invention, it is also possible to produce composite materials by combining the bonded mineral fibre product with suitable composite layers or laminate layers such as, e.g., metal, glass surfacing mats and other woven or non-woven materials.

The mineral fibre products according to the present invention generally have a density within the range of from 6 to 250 kg/m$^3$, preferably 20 to 200 kg/m$^3$. The mineral fibre products generally have a loss on ignition (LOI) within the range of 0.3 to 18.0%, preferably 0.5 to 8.0%.

Although the aqueous binder composition according to the present invention is particularly useful for bonding mineral fibres, it may equally be employed in other applications typical for binders and sizing agents, e.g. as a binder for foundry sand, glass fibre tissue, composites, moulded articles, coatings, such as metal adhesives.

Oxidized Lignins which can be Used as Component (i) in the Aqueous Binder Composition for Mineral Fibres According to the Present Invention and Method for Preparing Such Oxidized Lignins In the following, we describe oxidized lignins which can be used as component (i) and their preparation.

Oxidized lignins, which can be used as component (i) for the binders according to the present invention can be prepared by a method comprising bringing into contact
  a component (a) comprising one or more lignins
  a component (b) comprising ammonia, one or more amine components, and/or any salt thereof.
  a component (c) comprising one or more oxidation agents.

Component (a)

Component (a) comprises one or more lignins.

In one embodiment of the method according to the present invention, component (a) comprises one or more kraft lignins, one or more soda lignins, one or more lignosulfonate lignins, one or more organosolv lignins, one or more lignins from biorefining processes of lignocellulosic feedstocks, or any mixture thereof.

In one embodiment, component (a) comprises one or more kraft lignins.

Component (b)

In one embodiment according to the present invention, component (b) comprises ammonia, one or more amino components, and/or any salts thereof. Without wanting to be bound by any particular theory, the present inventors believe that replacement of the alkali hydroxides used in previously known oxidation processes of lignin by ammonia, one or more amino components, and/or any salts thereof, plays an important role in the improved properties of the oxidized lignins prepared according to the method of the present invention.

The present inventors have surprisingly found that the lignins oxidized by an oxidation agent in the presence of ammonia or amines contain significant amounts of nitrogen as a part of the structure of the oxidized lignins. Without wanting to be bound by any particular theory, the present inventors believe that the improved fire resistance properties of the oxidized lignins when used in products where they are comprised in a binder composition, said oxidised lignins prepared by the method according to the present invention, are at least partly due to the nitrogen content of the structure of the oxidized lignins.

In one embodiment, component (b) comprises ammonia and/or any salt thereof.

Without wanting to be bound by any particular theory, the present inventors believe that the improved stability properties of the derivatized lignins prepared according to the present invention are at least partly due to the fact that ammonia is a volatile compound and therefore evaporates from the final product or can be easily removed and reused. In contrast to that, it has proven difficult to remove residual amounts of the alkali hydroxides used in the previously known oxidation process.

Nevertheless, it can be advantageous in the method according to the present invention that component (b), besides ammonia, one or more amino components, and/or any salts thereof, also comprises a comparably small amount of an alkali and/or earth alkali metal hydroxide, such as sodium hydroxide and/or potassium hydroxide.

In the embodiments, in which component (b) comprises alkali and/or earth alkali metal hydroxides, such as sodium hydroxide and/or potassium hydroxide, as a component in addition to the ammonia, one or more amino components, and/or any salts thereof, the amount of the alkali and/or earth alkali metal hydroxides is usually small, such as 5 to 70 weight parts, such as 10 to 20 weight parts alkali and/or earth alkali metal hydroxide, based on ammonia.

Component (c)

In the method according to the present invention, component (c) comprises one or more oxidation agents.

In one embodiment, component (c) comprises one or more oxidation agents in form of hydrogen peroxide, organic or inorganic peroxides, molecular oxygen, ozone, halogen containing oxidation agents, or any mixture thereof.

In the initial steps of the oxidation, active radicals from the oxidant will typically abstract the proton from the phenolic group as that bond has the lowest dissociation energy in lignin. Due to lignin's potential to stabilize radicals through mesomerism multiple pathways open up to continue (but also terminate) the reaction and various intermediate and final products are obtained. The average molecular weight can both increase and decrease due to this complexity (and chosen conditions) and in their experiments, the inventors have typically seen moderate increase of average molecular weight of around 30%.

In one embodiment, component (c) comprises hydrogen peroxide.

Hydrogen peroxide is perhaps the most commonly employed oxidant due to combination of low price, good efficiency and relatively low environmental impact. When hydrogen peroxide is used without the presence of catalysts, alkaline conditions and temperature are important due to the following reactions leading to radical formation:

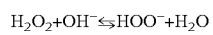

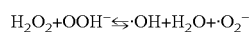

The present inventors have found that the derivatized lignins prepared with the method according to the present invention contain increased amounts of carboxylic acid groups as a result of the oxidation process. Without wanting to be bound by any particular theory, the present inventors believe that the carboxylic acid group content of the oxidized lignins prepared in the process according to the present invention plays an important role in the desirable reactivity properties of the derivatized lignins prepared by the method according to the present invention.

Another advantage of the oxidation process is that the oxidized lignin is more hydrophilic. Higher hydrophilicity can enhance solubility in water and facilitate the adhesion to polar substrates such as mineral fibers.

Further Components

In one embodiment, the method according to the present invention comprises further components, in particular a component (d) in form of an oxidation catalyst, such as one or more transition metal catalyst, such as iron sulfate, such as manganese, paladium, selenium, tungsten containing catalysts.

Such oxidation catalysts can increase the rate of the reaction, thereby improving the properties of the oxidized lignins prepared by the method according to the present invention.

Mass Ratios of the Components

The person skilled in the art will use the components (a), (b) and (c) in relative amounts that the desired degree of oxidation of the lignins is achieved.

In one embodiment,
a component (a) comprises one or more lignins
a component (b) comprises ammonia
a component (c) comprises one or more oxidation agents in form of hydrogen peroxide, wherein the mass ratios of lignin, ammonia and hydrogen peroxide are such that the amount of ammonia is 0.01 to 0.5 weight parts, such as 0.1 to 0.3, such as 0.15 to 0.25 weight parts ammonia, based on the dry weight of lignin, and wherein the amount of hydrogen peroxide is 0.025 to 1.0 weight parts, such as 0.05 to 0.2 weight parts, such as 0.075 to 0.125 weight parts hydrogen peroxide, based on the dry weight of lignin.

Process

There is more than one possibility to bring the components (a), (b) and (c) in contact to achieve the desired oxidation reaction.

In one embodiment, the method comprises the steps of:
a step of providing component (a) in form of an aqueous solution and/or dispersion of one more lignins, the lignin content of the aqueous solution being 1 to 50 weight-%, such as 5 to 25 weight-%, such as 15 to 22 weight-%, such as 18 to 20 weight-%, based on the total weight of the aqueous solution;
a pH adjusting step by adding component (b) comprising an aqueous solution of ammonia, one or more amine components, and/or any salt thereof;
an oxidation step by adding component (c) comprising an oxidation agent.

In one embodiment, the pH adjusting step is carried so that the resulting aqueous solution and/or dispersion is having a pH≥9, such as ≥10, such as ≥10.5.

In one embodiment, the pH adjusting step is carried out so that the resulting aqueous solution and/or dispersion is having a pH in the range of 10.5 to 12.

In one embodiment, the pH adjusting step is carried out so that the temperature is allowed to raise to ≥25° C. and then controlled in the range of 25-50° C., such as 30-45° C., such as 35-40° C.

In one embodiment, during the oxidation step, the temperature is allowed to raise ≥35° C. and is then controlled in the range of 35-150° C., such as 40-90° C., such as 45-80° C.

In one embodiment, the oxidation step is carried out for a time of 1 second to 48 hours, such as 10 seconds to 36 hours, such as 1 minute to 24 hours such as 2-5 hours.

Reaction Product

The present invention is also directed to oxidized lignins prepared by the method according to the present invention.

The present inventors have surprisingly found, that the oxidized lignins prepared according to the method of the present invention have very desirable reactivity properties and at the same time display improved fire resistance properties when used in products where they are comprised in a binder composition, and improved long term stability over previously known oxidized lignins.

The oxidised lignin also displays improved hydrophilicity.

An important parameter for the reactivity of the oxidized lignins prepared by the method according to the present invention is the carboxylic acid group content of the oxidized lignins.

In one embodiment, the oxidized lignin prepared according to the present invention has a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (a).

Another way to describe the carboxylic acid group content is by using average carboxylic acid group content per lignin macromolecule according to the following formula:

$$\text{Average COOH functionality} = \frac{\text{total moles COOH}}{\text{total moles lignin}}$$

In one embodiment, the oxidized lignin prepared according to the present invention has an average carboxylic acid group content of more than 1.5 groups per macromolecule of component (a), such as more than 2 groups, such as more than 2.5 groups.

The following examples are intended to further illustrate the invention without limiting its scope.

EXAMPLES

In the following examples, several binders which fall under the definition of the present invention were prepared and compared to binders according to the prior art.

The following properties were determined for the binders according to the present invention and the binders according to the prior art, respectively:

Binder Component Solids Content

The content of each of the components in a given binder solution before curing is based on the anhydrous mass of the components.

Reaction Loss—Definition

The reaction loss is defined as the difference between the binder component solids content and the binder solids.

Accordingly, the reaction loss is calculated by the formula:

reaction loss=(binder component solids−binder solids)/(binder component solids)

Kraft lignin was supplied by UPM as LignoBoost™, UPM BioPiva 100 as powder, oxidized Kraft lignin based on UPM BioPiva 100 (AOL) was supplied by Aarhus University as a dispersion in ammonia and water of 18.3 wt.-% dry matter and a carboxylic acid group content of 0.80 mmol/g, number average molecular weight Mn of 2503 g/mol and weight average molecular weight Mw of 34503 g/mol, Primid XL552 was supplied by EMS-CHEMIE AG, 100% dry matter Epocros WS700 was supplied by Nippon Shokubai, 25% dry matter Picassian XL702 was supplied by Stahl Polymer 40% dry matter, Soda lignin was supplied as Protobind 1000 from Green Value Switzerland as powder, Oxidized soda lignin (AOL) was supplied by Aarhus University in 22% dry matter based on oxidation of Protobind 1000 from Green Value, lignin derived from the LignoForce process was supplied from West Fraser, Alberta, US as dry powder, oxidized lignin derived from LignoForce from West Fraser, Alberta, US (AOL) was supplied by Aarhus University in 22% dry matter Silane (Momentive VS-142 40% activity, Momentive A1871 100% activity, Momentive A187 100% activity and Momentive DP200 100% activity) were supplied by Momentive and was calculated as 100% for simplicity, PEG (200-400), Poly(ethylene glycol) dimethyl ether 250 and 1-phenoxy-2-propanol were supplied by Sigma-Aldrich and were assumed anhydrous for simplicity.

Binder Solids

The content of binder after curing is termed "binder solids".

Disc-shaped stone wool samples (diameter: 5 cm; height 1 cm) were cut out of stone wool and heat-treated at 580° C. for at least 30 minutes to remove all organics. The solids of the binder mixture was measured by distributing a sample of the binder mixture (approx. 2 g) onto a heat treated stone wool disc in a tin foil container. The weight of the tin foil container containing the stone wool disc was weighed before and directly after addition of the binder mixture. Two such binder mixture loaded stone wool discs in tin foil containers were produced and they were then heated at 200° C. for 1 hour. After cooling and storing at room temperature for 10 minutes, the samples were weighed and the binder solids was calculated as an average of the two results.

A binder with a desired binder solids could then be produced by diluting with the required amount of water and 10% aq. silane (Momentive VS-142).

Mechanical Strength Studies

Tablet Tests:

The mechanical strength of the binders was tested in a tablet test. For each binder, six tablets were manufactured from a mixture of the binder and stone wool shots from the stone wool spinning production. The shots are particles which have the same melt composition as the stone wool fibers, and the shots are normally considered a waste product from the spinning process. The shots used for the tablet composition have a size of 0.25-0.50 mm.

A sample of a binder solution having 15% dry solid matter (4.0 g) was mixed well with shots (20.0 g). The resulting mixture was then transferred into a round aluminum foil container (bottom Ø=4.5 cm, top Ø=7.5 cm, height=1.5 cm). The mixture was then pressed hard with a suitably sized flat bottom glass or plastic beaker to generate an even tablet surface. Six tablets from each binder were made in this fashion. The resulting tablets were then cured at 200° C., 225° C. or 250° C. for 1 h (reference binder A: 200° C. for 1 h). After cooling to room temperature, the tablets were carefully taken out of the containers. Three of the tablets were aged in a water bath at 80° C. for 3 h.

After drying for 1-2 days, all tablets were then broken in a 3 point bending test (test speed: 10.0 mm/min; rupture level: 50%; nominal strength: 30 N/mm$^2$; support distance: 40 mm; max deflection 20 mm; nominal e-module 10000 N/mm$^2$) on a Bent Tram machine to investigate their mechanical strengths. The tablets were placed with the "bottom face" up (i.e. the face with Ø=4.5 cm) in the machine.

Bar Tests

The mechanical strength of the binders was tested in a bar test. For each binder, 16 bars were manufactured from a mixture of the binder and stone wool shots from the stone wool spinning production.

A sample of this binder solution having 15% dry solid matter (16.0 g) was mixed well with shots (80.0 g). The resulting mixture was then filled into four slots in a heat resistant silicone form for making small bars (4×5 slots per form; slot top dimension: length=5.6 cm, width=2.5 cm; slot bottom dimension: length=5.3 cm, width=2.2 cm; slot height=1.1 cm). The mixtures placed in the slots were then pressed with a suitably sized flat metal bar to generate even bar surfaces. 16 bars from each binder were made in this fashion. The resulting bars were then cured typically at 200° C. but other temperatures were also used as stated in Table 1-4 and Table 1-5. The curing time was 1 h. After cooling to room temperature, the bars were carefully taken out of the containers. Five of the bars were aged in a water bath at 80° C. for 3 h.

After drying for 1-2 days, the aged bars as well as five unaged bars were broken in a 3 point bending test (test speed: 10.0 mm/min; rupture level: 50%; nominal strength: 30 N/mm$^2$; support distance: 40 mm; max deflection 20 mm; nominal e-module 10000 N/mm$^2$) on a Bent Tram machine to investigate their mechanical strengths. The bars were placed with the "top face" up (i.e. the face with the dimensions length=5.6 cm, width=2.5 cm) in the machine.

Fiber Bar Test

The mechanical strength of the binders was tested in a fiber bar test. For each binder, sixteen bars were manufactured from a mixture of the binder and stone wool fibers (Rockforce® MS600-Roxul®1000 from Lapinus™). The objective of this test is to determine the binder strength of a binder, when used in a stone wool composite, before and after aging. The strength is determined from three point bending from which the flexural strength is derived.

A 20% binder solids binder solution containing 0.5% silane (Momentive variants) of binder solids was obtained as described above. A sample of the binder solution (470 g) was mixed with MS600 fibres (1350 g) for 4 minutes at 3000 rpm. The resulting mixture was then transferred into a special designed mould (250×50×80 mm (L×W×H), 110.0 g in each. The mould is pressed by use of a pneumatic press with a consolidation pressure at 1.1 MPa. The pressure is held for 75 sec. to obtain a bars with the thickness of 7-10 mm and a density of 0.85-0.95 g/cm$^3$. The green body is then transferred to an oven rack and cured at 200° C., 225° C. or 250° C. for 2 h (reference binder A: 200° C. for 2 h), when 16 bars have been produced.

8 of the bars were aged at 120° C. and 1 bar overpressure for 15 min in an autoclave. Aged samples can be left inside the autoclave overnight or be stacked in an aluminium tray and put in a room at ambient conditions. Regardless of the way of storage, samples are ready to be tested the following day or later.

The mechanical properties of the unaged bars (8 pieces) and aged (unaged) bars were quantified by three point bending following EN310 (test speed: 5 mm/min, rapture level: 10%, nominal E-module: 1000 N/mm$^2$, nominal strength: 5 N/mm$^2$, support distance: 140 mm, max deflection: 20 mm.

The flexural strength is calculated as:

$$\sigma_{fs} = \frac{Mc}{I}$$

Where M is the maximum bending moment, $$M = \frac{F_f s}{4},$$

with $F_f$ being the load applied at the point of failure [N] and s is the support bar distance [mm]. c is the distance from the centre of a specimen to the outer fibres, $$c = \frac{t}{2},$$

with t being the sample thickness [mm]. And I is the moment of inertia at the cross section which, for a rectangular geometry, is $$I = \frac{wt^3}{12},$$

with w and t being the sample width and thickness, respectively [mm].

Combined this yields:

$$\sigma_{fs} = \frac{3F_f s}{2wt^2} \left[\frac{N}{mm^2}\right] [MPa]$$

Adhesive Lap Joint Shear Strength Test:

The mechanical properties of the lignin based binders were quantified by use of single lap shear test, which is a well-known test method for comparing shear strength of adhesives and ASTM standards exist such as ASTM D1002 for various substrates that are being bonded. The sample preparation includes application of a binder sample to a substrate, overlapping it with another piece of designated overlap area, applying pressure on the overlap area and curing the adhesive at specified conditions.

10 mL of lignin based binder (having a dry solid content of 20%) was placed in an open beaker and left in a fumehood at room temperature for 2 h with gentle stirring by glass rod for every 20-30 min. 5 mg of binder (20% dry solid matter) was applied to the first glass slide (75×25×2 mm), overlapped within 25×20 mm area with another glass slide and pressed with 350 g weight. The sample is cured at 200° C. for 10 min. 12 samples are made for each formulation. Each sample end of the specimen was loaded in the tensile grips (ADMET eXpert 2611) with a 500N load cell. A force was applied at a controlled rate (0.3 mm/min) to the specimen until it breaks and record the maximum force that is used for comparison between samples.

Figure 5:
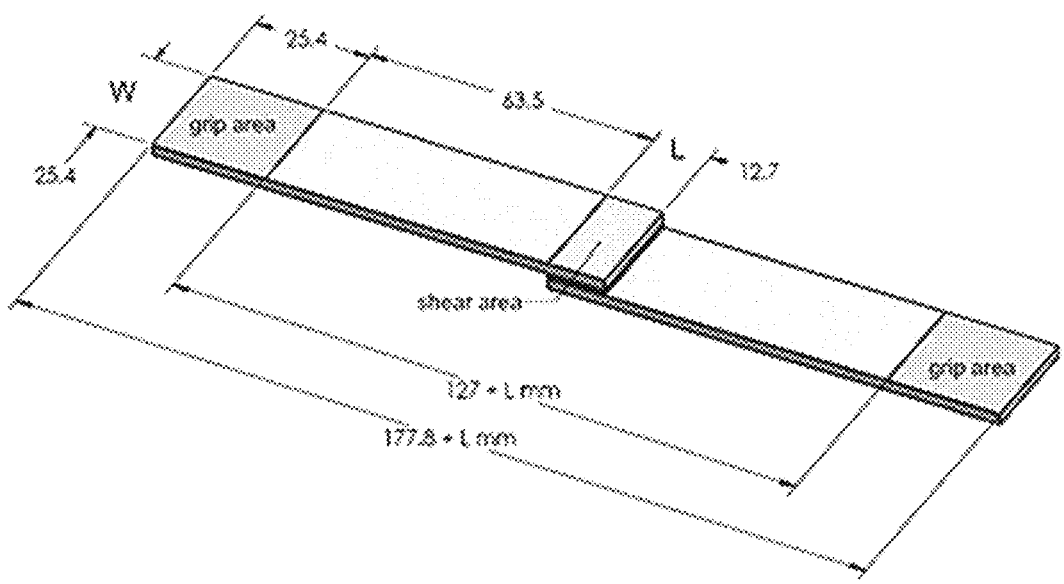
FIG. 5 shows a lap joint shear strength test specimen.

A schematic representation of the adhesive lap joint shear strength test is shown in FIG. 5.

Binder Example, Reference Binder A (Phenol-Formaldehyde Resin Modified with Urea, a PUF-Resol)

This binder is a phenol-formaldehyde resin modified with urea, a PUF-resol.

A phenol-formaldehyde resin is prepared by reacting 37% aq. formaldehyde (606 g) and phenol (189 g) in the presence of 46% aq. potassium hydroxide (25.5 g) at a reaction temperature of 84° C. preceded by a heating rate of approximately 1° C. per minute. The reaction is continued at 84° C. until the acid tolerance of the resin is 4 and most of the phenol is converted. Urea (241 g) is then added and the mixture is cooled.

The acid tolerance (AT) expresses the number of times a given volume of a binder can be diluted with acid without the mixture becoming cloudy (the binder precipitates). Sulfuric acid is used to determine the stop criterion in a binder production and an acid tolerance lower than 4 indicates the end of the binder reaction.

To measure the AT, a titrant is produced from diluting 2.5 ml conc. sulfuric acid (>99%) with 1 L ion exchanged water. 5 mL of the binder to be investigated is then titrated at room temperature with this titrant while keeping the binder in motion by manually shaking it; if preferred, use a magnetic stirrer and a magnetic stick. Titration is continued until a slight cloud appears in the binder, which does not disappear when the binder is shaken.

The acid tolerance (AT) is calculated by dividing the amount of acid used for the titration (mL) with the amount of sample (mL):

AT=(Used titration volume (mL))/(Sample volume (mL))

Using the urea-modified phenol-formaldehyde resin obtained, a binder is made by addition of 25% aq. ammonia (90 mL) and ammonium sulfate (13.2 g) followed by water (1.30 kg).

The binder solids were then measured as described above and the mixture was diluted with the required amount of water and silane for mechanical measurements (15% binder solids solution, 0.5% silane of binder solids).

Binder Example, Reference Binder B

A mixture of 75.1% aq. glucose syrup (19.98 g; thus efficiently 15.0 g glucose syrup), 50% aq. hypophosphorous acid (0.60 g; thus efficiently 0.30 g, 4.55 mmol hypophosphorous acid) and sulfamic acid (0.45 g, 4.63 mmol) in water (30.0 g) was stirred at room temperature until a clear solution was obtained.

28% aq. ammonia (0.80 g; thus efficiently 0.22 g, 13.15 mmol ammonia) was then added dropwise until pH=7.9. The binder solids was then measured (21.2%).

For mechanical strength studies (15% binder solids solution, 0.5% silane of binder solids), the binder mixture was diluted with water (0.403 g/g binder mixture) and 10% aq. silane (0.011 g/g binder mixture, Momentive VS-142). The final binder mixture for mechanical strength studies had pH=7.9.

Binder Example, Entry 2:

To a mixture of 18.2% aq. Kraft lignin, unoxidized (100 g, thus efficiently 18.2 g lignin) stirred at room temperature was added 5.0 g polyethyleneglycol 300 and 1.4 g Primid XL552. The binder solids was then measured (21.2%).

For mechanical tests (15% binder solids, 0.5% silane of binder solids), the mixture was diluted with water (0.402 g/g binder mixture) and 10% aq. Silane (0.011 g/g binder mixture, Momentive A1871, prehydrolysed in acetic conditions with 10% acetic acid, diluted with water). The final binder mixture for mechanical tests had pH=10.2.

Binder Compositions According to the Present Invention

In the following, the entry numbers of the binder example correspond to the entry numbers used in Table 1-1 to 1-5.

Binder Example, Entry 1:

To a mixture of 18.3% aq. AOL based on oxidized Kraft lignin from UPM (100 g, thus efficiently 18.3 g AOL) stirred at room temperature was added 5.0 g polyethyleneglycol 300 and 2.5 g Primid XL552. The binder solids was then measured (21.2%).

For mechanical tests (15% binder solids, 0.5% silane of binder solids), the mixture was diluted with water (0.402 g/g binder mixture) and 10% aq. Silane (0.011 g/g binder mixture, Momentive A1871, prehydrolysed in acetic conditions with 10% acetic acid, diluted with water). The final binder mixture for mechanical tests had pH=10.2.

Binder Example, Entry 7:

To a mixture of 18.3% aq. AOL based on oxidized Kraft lignin from UPM (100 g, thus efficiently 18.3 g AOL) stirred at room temperature was added 5.0 g polyethyleneglycol 300 and 5.0 g Primid XL552. The binder solids was then measured (22.6%).

For mechanical tests (15% binder solids), the mixture was diluted with water (0.496 g/g binder mixture) and 10% aq. Silane (0.011 g/g binder mixture, Momentive A1871, prehydrolysed in acetic conditions with 10% acetic acid). The final binder mixture for mechanical tests had pH=10.2.

Binder Example, Entry 10:

To a mixture of 18.3% aq. AOL based on oxidized Kraft lignin from UPM (100 g, thus efficiently 18.3 g AOL) stirred at room temperature was added 5.0 g polyethyleneglycol 300 and 3.8 g Primid XL552. The binder solids was then measured (23.1%).

For mechanical tests, lap shear test (20% binder solids), the mixture was diluted with water (0.155 g/g binder mixture). The final binder mixture for mechanical tests had pH=10.2.

Binder Example, Entry 14:

To a mixture of 18.3% aq. AOL based on oxidized Kraft lignin from UPM (100 g, thus efficiently 18.3 g AOL) stirred at room temperature was added 5.0 g polyethyleneglycol 300 and 30.0 g Epocros WS700. The binder solids was then measured (21.8%).

For mechanical tests, cake tests (15% binder solids, 0.5% silane of binder solids), the mixture was diluted with water (0.442 g/g binder mixture) and 10% aq. Silane (0.011 g/g binder mixture, Momentive A1871, prehydrolysed in acetic conditions with 10% acetic acid, diluted with water). The final binder mixture for mechanical tests had pH=10.2.

Binder Example, Entry 26:

To a mixture of 21.1% aq. Oxidized soda lignin based on oxidation of Protobind 1000 from Green Value SA (Switzerland) (100 g, thus efficiently 21.1 g AOL) stirred at room temperature was added 5.0 g polyethyleneglycol 300 and 4.4 g Primid XL552. The binder solids was then measured (21.1%).

For mechanical tests, mini bar tests (15% binder solids, 0.5% silane of binder solids), the mixture was diluted with water (0.396 g/g binder mixture) and 10% aq. Silane (0.011 g/g binder mixture, Momentive VS142). The final binder mixture for mechanical tests had pH=10.1.

Example with Oxidized LignoForce:

To a mixture of 18.3% aq. AOL (based on oxidised LignoForce from West Fraser, Alberta, US) (100 g, thus efficiently 18.3 g AOL) stirred at room temperature was added 5.0 g polyethyleneglycol 300 and 2.5 g Primid XL552. The binder solids was then measured (21.2%).

For mechanical tests (15% binder solids, 0.5% silane of binder solids), the mixture was diluted with water (0.402 g/g binder mixture) and 10% aq. Silane (0.011 g/g binder mixture, Momentive A1871, prehydrolysed in acetic conditions with 10% acetic acid, diluted with water). The final binder mixture for mechanical tests had pH=10.2.

The following observations and conclusions can be made from table 1:

When comparing the difference between the binder component solid content and the binder solids, said difference being defined as the binder loss for the examples in table 1-1, table 1-2 and table 1-3, it can be seen, that the binder loss is similar or lower in the lignin based binders compared to reference A and B. The applicants believe this is due to the high molecular weight of lignin compared to the lower molecular weight of reactants in the binder compositions of reference A and B. Accordingly, a higher LOI (loss of ignition) in the final product can be achieved with the use of less organic starting material, when comparing with other binder compositions based on renewable sources, such as reference B.

As can be seen when comparing the results in Table 1-1, Table 1-2 and Table 1.3, oxidation of kraft lignin is preferred compared to kraft lignin (1 versus 2), addition of Primid XL552 is preferred as cross-linker (1 versus 3, 14 and 15) and silane is preferred as coupling agent (1 versus 6), which yields a mineral wool products according to the present invention with high mechanical strength (aged and unaged), comparable to the reference binder compositions A and B.

As can be seen when comparing the results in Table 1-4, the curing temperature influences the final mechanical properties, where cured products at 220° C. show mechanical properties comparable to the reference binder compositions A and B.

As can also be seen when comparing the results in Table 1-5, the oxidation of soda lignin has a positive influence on the final mechanical properties—similar to the effect of oxidation of kraft lignin, showed in the results in Table 1-1. Influence of the curing temperature is also seen here, where the mechanical properties are increased by increasing the temperature, again comparable with the reference binder compositions A and B.

This overall means, we are able to produce a formaldehyde-free binder composition with a high content of renewable material based on lignin, which has a lower reaction loss and comparable mechanical properties to the reference systems.

TABLE 1-1

| Binder composition | Ref A | Ref B | 1 | 2 | 3 | 4 | 5 | 6 |
|---|---|---|---|---|---|---|---|---|
| Kraft lignin dissolved (g) | — | — | — | 100 | — | — | — | — |
| Oxidized Kraft lignin (g) | — | — | 100 | — | 100 | 90 | 100 | 100 |
| Soda lignin (g) | — | — | — | — | — | — | — | — |
| Oxidized soda lignin (g) | — | — | — | — | — | — | — | — |
| PEG 300 (g) | — | — | 5.0 | 5.0 | 5.0 | — | — | 5.0 |
| Poly(ethylene glycol) dimethyl ether 250 (g) | — | — | — | — | — | — | — | — |

TABLE 1-1-continued

| Binder composition | Ref A | Ref B | 1 | 2 | 3 | 4 | 5 | 6 |
|---|---|---|---|---|---|---|---|---|
| PEG 200 (g) | — | — | — | — | — | — | — | — |
| PEG 400 (g) | — | — | — | — | — | — | — | — |
| 1-phenoxy-2-propanol | — | — | — | — | — | — | — | — |
| Primid XL552 (g) | — | — | 2.5 | 1.4 | — | — | 2.5 | 2.5 |
| Epocros W5700 25 w % (g) | — | — | — | — | — | — | — | — |
| Picassian XL-702 (g) | — | — | — | — | — | — | — | — |
| Momentive A1871 (% of binder solids), based on 100% activity | — | — | 0.5 | 0.5 | — | 0.5 | — | — |
| Momentive A187 (% of binder solids), based on 100% activity | — | — | — | — | — | — | — | — |
| Momentive VS 142 (% of binder solids), based on 40% activity | 0.5 | 0.5 | — | — | — | — | — | — |
| Binder properties | | | | | | | | |
| Mechanical strength, unaged (kN), tablets | 0.33 | 0.18 | 0.32 | — | — | — | — | — |
| Mechanical strength, aged (kN), tablets | 0.28 | 0.13 | 0.28 | — | — | — | — | — |
| Mechanical strength, unaged (kN), bars tests | 0.39 | 0.25 | 0.21 | 0.12 | 0.08 | 0.00 | 0.03 | 0.03 |
| Mechanical strength, aged (kN), bar tests | 0.27 | 0.20 | 0.15 | 0.07 | 0.01 | 0.00 | 0.00 | 0.07 |
| Mechanical strength, unaged (N/mm2), fiber bar tests (22% dry solid content) | 1.06 | 0.80 | — | — | — | — | — | — |
| Mechanical strength, aged (N/mm2), fiber bar tests (22% dry solid content) | 0.60 | 0.58 | — | — | — | — | — | — |
| Maximum force (N), lap shear test | — | — | — | — | — | 0.00 | 33.8 | — |
| Reaction loss, % | 38% | 30% | 33% | 25% | 33% | — | 26% | 30% |

TABLE 1-2

| Binder composition | 1 | 5 | 7 | 8 | 9 | 10 | 11 | 12 | 13 |
|---|---|---|---|---|---|---|---|---|---|
| Kraft lignin dissolved (g) | — | — | — | | | | | | |
| Oxidized Kraft lignin (g) | 100 | 100 | 100 | 100 | 100 | 100 | 100 | 100 | 100 |
| Soda lignin (g) | — | — | — | | | | | | |
| Oxidized soda lignin (g) | — | — | — | | | | | | |
| PEG 300 (g) | 5.0 | — | 5.0 | 5.0 | — | — | — | 5.0 | — |
| Poly(ethylene glycol) dimethyl ether 250 (g) | — | — | — | — | — | — | 5.0 | — | — |
| PEG 200 (g) | — | — | — | — | — | 5.0 | — | — | — |
| PEG 400(g) | — | — | — | — | 5.0 | — | — | — | — |
| 1-phenoxy-2-propanol | — | — | — | — | — | — | — | — | 4.3 |
| Primid XL552 (g) | 2.5 | 2.5 | 5 | 3.8 | 3.8 | 3.8 | 3.8 | 3.8 | 2.5 |
| Epocros W5700 25 w % (g) | — | — | — | — | — | — | — | — | — |
| Picassian XL-702 (g) | — | — | — | — | — | — | — | — | — |
| Momentive A1871 (% of binder solids), based on 100% activity | 0.5 | — | 0.5 | — | — | — | — | — | 0.5 |
| Momentive A187 (% of binder solids), based on 100% activity | — | — | — | — | — | — | — | — | — |
| Momentive VS 142 (% of binder solids), based on 40% activity | — | — | — | — | — | — | — | — | — |
| Binder properties | | | | | | | | | |
| Mechanical strength, unaged (N), tablets | 0.32 | — | — | — | — | — | — | — | 0.24 |
| Mechanical strength, aged (N), tablets | 0.28 | — | — | — | — | — | — | — | 0.22 |
| Mechanical strength, unaged (N), bars tests | 0.21 | 0.03 | 0.20 | — | — | — | — | — | — |
| Mechanical strength, aged (N), bar tests | 0.15 | 0.00 | 0.13 | — | — | — | — | — | — |
| Mechanical strength, unaged (N/mm2), fiber bar tests (22% dry solid content) | — | — | — | — | — | — | — | — | — |
| Mechanical strength, aged (N/mm2), fiber bar tests (22% dry solid content) | — | — | — | — | — | — | — | — | — |
| Maximum force (N), lap shear test | — | 33.8 | — | 127.0 | 119.0 | 166.0 | 135.0 | 54.2 | — |
| Reaction loss, % | 33% | 26% | 38% | — | — | — | — | — | 36% |

TABLE 1-3

| Binder composition | 1 | 14 | 15 |
|---|---|---|---|
| Kraft lignin dissolved (g) | — | | |
| Oxidized Kraft lignin (g) | 100 | 100 | 100 |
| Soda lignin (g) | — | — | — |
| Oxidized soda lignin (g) | — | — | — |
| PEG 300 (g) | 5.0 | 5.0 | 3.2 |

TABLE 1-3-continued

| Binder composition | 1 | 14 | 15 |
|---|---|---|---|
| Poly(ethylene glycol) dimethyl ether 250 (g) | — | — | — |
| PEG 200 (g) | — | — | — |
| PEG 400 (g) | — | — | — |
| 1-phenoxy-2-propanol | — | — | — |
| Primid XL552 (g) | 2.5 | — | — |
| Epocros WS700 25 w % (g) | — | 30 | 30 |
| Picassian XL-702 (g) | — | — | — |
| Momentive A1871 (% of binder solids), based on 100% activity | 0.5 | 0.5 | 0.5 |
| Momentive A187 (% of binder solids), based on 100% activity | — | — | — |
| Momentive VS 142 (% of binder solids), based on 40% activity | — | — | — |
| Binder properties | | | |
| Mechanical strength, unaged (N), tablets | 0.32 | 0.28 | 0.23 |
| Mechanical strength, aged (N), tablets | 0.28 | 0.18 | 0.19 |
| Mechanical strength, unaged (N), bars tests | 0.21 | — | — |
| Mechanical strength, aged (N), bar tests | 0.15 | — | — |
| Mechanical strength, unaged (N/mm2), fiber bar tests (22% dry solid content) | — | — | — |
| Mechanical strength, aged (N/mm2), fiber bar tests (22% dry solid content) | — | — | — |
| Maximum force (N), lap shear test | — | — | — |
| Reaction loss, % | 33% | 63% | 64% |

TABLE 1-4

| Binder composition | 1 | 16 | 17 | 18 | 19 | 20 | 21 | 22 |
|---|---|---|---|---|---|---|---|---|
| Kraft lignin dissolved (g) | — | | | | | | | |
| Oxidized Kraft lignin (g) | 100 | 100 | 100 | 100 | 100 | 100 | 100 | 100 |
| Soda lignin (g) | | | | | | | | |
| Oxidized soda lignin (g) | — | | | | | | | |
| PEG 300 (g) | 5.0 | 5.0 | 5.0 | 5.0 | 5.0 | 5.0 | 5.0 | 5.0 |
| Poly(ethylene glycol) dimethyl ether 250 (g) | — | — | — | — | — | — | — | — |
| PEG 200 (g) | — | — | — | — | — | — | — | — |
| PEG 400 (g) | — | — | — | — | — | — | — | — |
| 1-phenoxy-2-propanol | — | — | — | — | — | — | — | — |
| Primid XL552 (g) | 2.5 | 2.5 | 2.5 | 2.5 | 2.5 | 2.5 | 2.5 | 2.5 |
| Epocros W5700 25 w % (g) | — | — | — | — | — | — | — | — |
| Picassian XL-702 (g) | — | — | — | — | — | — | — | — |
| Momentive A1871 (% of binder solids), based on 100% activity | 0.5 | — | — | — | — | 0.5 | 0.5 | 0.5 |
| Momentive A187 (% of binder solids), based on 100% activity | — | — | — | — | — | — | — | — |
| Momentive VS 142 (% of binder solids), based on 40% activity | — | 0.5 | 0.5 | 0.5 | 0.5 | — | — | — |
| Binder properties | | | | | | | | |
| Mechanical strength, unaged (N), tablets | 0.32 | — | — | — | — | — | — | — |
| Mechanical strength, aged (N), tablets | 0.28 | — | — | — | — | — | — | — |
| Mechanical strength, unaged (N), bars tests | 0.21 | 0.12 | 0.18 | 0.23 | 0.27 | 0.23 | 0.27 | 0.29 |
| Mechanical strength, aged (N), bar tests | 0.15 | 0.03 | 0.08 | 0.15 | 0.17 | 0.12 | 0.17 | 0.27 |
| Mechanical strength, unaged (N/mm2), fiber bar tests (22% dry solid content) | — | — | — | — | — | — | — | — |
| Mechanical strength, aged (N/mm2), fiber bar tests (22% dry solid content) | — | — | — | — | — | — | — | — |
| Maximum force (N), lap shear test | — | — | — | — | — | — | — | — |
| Reaction loss, % | 33% | 33% | 33% | 33% | 33% | 33% | 33% | 33% |
| Curing temp, ° C. | 200 | 160 | 180 | 200 | 220 | 180 | 200 | 220 |

TABLE 1-5

| Binder composition | 1 | 18 | 19 | 23 | 24 | 25 | 26 | 27 | 28 | 29 | 30 |
|---|---|---|---|---|---|---|---|---|---|---|---|
| Kraft lignin dissolved (g) | — | | | | | | — | — | — | — | — |
| Oxidized Kraft lignin (g) | 100 | 100 | 100 | | | | | 100 | — | 100 | — |
| Soda lignin (g) | | | | 100 | 100 | | | — | 100 | — | 100 |
| Oxidized soda lignin (g) | | | | | | 100 | 100 | — | 100 | — | 100 |
| PEG 300 (g) | 5.0 | 5.0 | 5.0 | 5.0 | 5.0 | 5.0 | 5.0 | 5.0 | 5.0 | 5.0 | 5.0 |
| Poly(ethylene glycol) dimethyl ether 250 (g) | — | — | — | — | — | — | — | — | — | — | — |
| PEG 200 (g) | — | — | — | — | — | — | — | — | — | — | — |
| PEG 400 (g) | — | — | — | — | — | — | — | — | — | — | — |
| 1-phenoxy-2-propanol | — | — | — | — | — | — | — | — | — | — | — |

TABLE 1-5-continued

| Binder composition | 1 | 18 | 19 | 23 | 24 | 25 | 26 | 27 | 28 | 29 | 30 |
|---|---|---|---|---|---|---|---|---|---|---|---|
| Primid XL552 (g) | 2.5 | 2.5 | 2.5 | 3.0 | 3.0 | 4.4 | 4.4 | 3.0 | 4.4 | 3.0 | 4.4 |
| Epocros W5700 25 w % (g) | — | — | — | — | — | — | — | — | — | — | — |
| Picassian XL-702 (g) | — | — | — | — | — | — | — | — | — | — | — |
| Momentive A1871 (% of binder solids), based on 100% activity | 0.5 | — | — | — | — | — | — | 0.5 | 0.5 | — | — |
| Momentive A187 (% of binder solids), based on 100% activity | — | — | — | — | — | — | — | — | — | 0.5 | 0.5 |
| Momentive VS 142 (% of binder solids), based on 40% activity | — | 0.5 | 0.5 | 0.5 | 0.5 | 0.5 | 0.5 | — | — | — | — |
| Binder properties | | | | | | | | | | | |
| Mechanical strength, unaged (N), tablets | 0.32 | — | — | — | — | — | — | — | — | — | — |
| Mechanical strength, aged (N), tablets | 0.28 | — | — | — | — | — | — | — | — | — | — |
| Mechanical strength, unaged (N), bars tests | 0.21 | 0.23 | 0.27 | 0.11 | 0.16 | 0.24 | 0.24 | 0.19 | 0.25 | 0.19 | 0.24 |
| Mechanical strength, aged (N), bar tests | 0.15 | 0.15 | 0.17 | 0.07 | 0.14 | 0.11 | 0.16 | 0.16 | 0.22 | 0.15 | 0.26 |
| Mechanical strength, unaged (N/mm2), fiber bar tests (22% dry solid content) | — | — | — | — | — | — | — | — | — | — | — |
| Mechanical strength, aged (N/mm2), fiber bar tests (22% dry solid content) | — | — | — | — | — | — | — | — | — | — | — |
| Force at break (N), lap shear test | — | — | — | — | — | — | — | — | — | — | — |
| Reaction loss, % | 33% | 33% | 33% | — | — | — | — | — | — | — | — |
| Curing temp, ° C. | 200 | 200 | 220 | 200 | 220 | 200 | 220 | 200 | 220 | 200 | 220 |

The following examples are directed to the preparation of an oxidized lignin, which can be used as component (i) of the aqueous binder composition according to present invention.

EXAMPLES

Example A—Lignin Oxidation in Ammonia Aqueous Solution by Hydrogen Peroxide

The amounts of ingredients used according to the example A are provided in table A 1.1 and A 1.2

During the development of the method according to present invention, the inventors have first started with lab-scale experiments which were performed in the scale of approximately 1 L.

Although kraft lignin is soluble in water at relatively high pH, it is known that at certain weight percentage the viscosity of the solution will strongly increase. It is typically believed that the reason for the viscosity increase lies in a combination of strong hydrogen bonding and interactions of n-electrons of numerous aromatic rings present in lignin. For kraft lignin an abrupt increase in viscosity around 21-22 wt.-% in water was observed and 19 wt.-% of kraft lignin were used in the example presented.

Ammonia aqueous solution was used as base in the pH adjusting step. The amount was fixed at 4 wt.-% based on the total reaction weight. The pH after the pH adjusting step and at the beginning of oxidation was 10.7.

Table A 2 shows the results of CHNS elemental analysis before and after oxidation of kraft lignin. Before the analysis, the samples were heat treated at 160° C. to remove adsorbed ammonia. The analysis showed that a certain amount of nitrogen became a part of the structure of the oxidized lignin during the oxidation process.

During testing in batch experiments it was determined that it is beneficial for the oxidation to add the entire amount of hydrogen peroxide during small time interval contrary to adding the peroxide in small portions over prolonged time period. In the present example 2.0 wt.-% of $H_2O_2$ based on the total reaction weight was used.

The oxidation is an exothermic reaction and increase in temperature is noted upon addition of peroxide. In this example, temperature was kept at 60° C. during three hours of reaction.

After the oxidation, the amount of lignin functional groups per gram of sample increased as determined by $^{31}P$ NMR and aqueous titration. Sample preparation for $^{31}P$ NMR was performed by using 2-chloro-4,4,5,5-tetramethyl-1,3,2-dioxaphospholane (TMDP) as phosphitylation reagent and cholesterol as internal standard. NMR spectra of kraft lignin before and after oxidation are shown on FIG. 4 and the results are summarized in table A 3.

Figure 6:
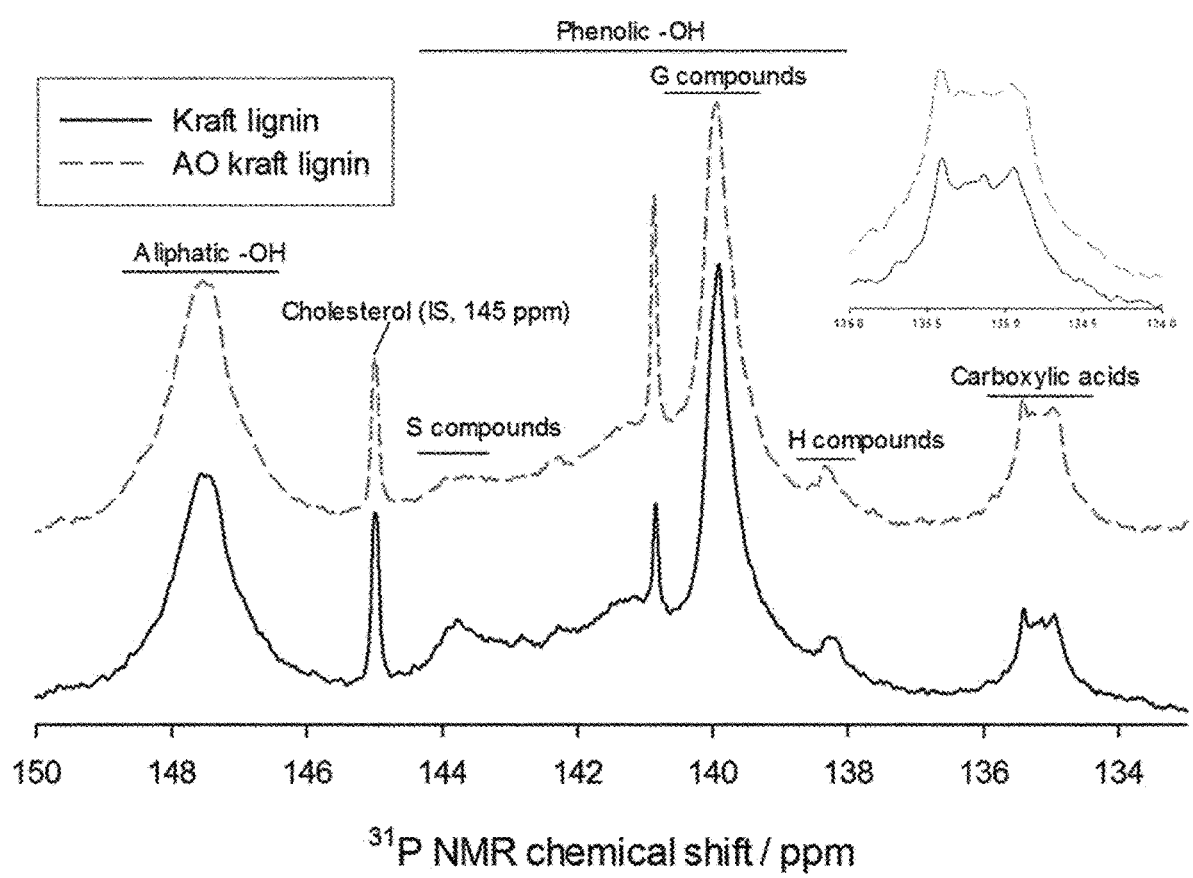
FIG. 6 shows $^{31}$P-NMR spectra of kraft lignin and ammonia oxidized kraft lignin (AOL).

FIG. 6 shows $^{31}P$ NMR of kraft lignin and ammonia oxidized kraft lignin (AOL). The different hydroxyl groups, as well as the internal standard, are shown in the plot, where S, G and H refer to syringyl, guaiacyl and coumaryl (hydroxyphenyl), respectively. The insert shows the signals from carboxyl groups without off-set. The change in COOH groups was also determined by aqueous titration and utilization of the following formula:

$$C_{(COOH, mmol/g)} = \frac{(V_{2s,ml} - V_{1s,ml}) - (V_{2b,ml} - V_{1b,ml}) * C_{acid, mol/l}}{m_{s,g}}$$

Where $V_{2s}$ and $V_{1s}$ are endpoint volumes of a sample while $V_{2b}$ and $V_{1b}$ are the volume for the blank. $C_{acid}$ is 0.1M HCl in this case and $m_s$ is the weight of the sample. The values obtained from aqueous titration before and after oxidation are shown in table A 4.

The average COOH functionality can also be quantified by a saponification value which represents the number of mg of KOH required to saponify 1 g lignin. Such a method can be found in AOCS Official Method Cd 3-25.

Average molecular weight was also determined before and after oxidation with a PSS PolarSil column (9:1 (v/v) dimethyl sulphoxide/water eluent with 0.05 M LiBr) and UV detector at 280 nm. Combination of COOH concentration and average molecular weight also allowed calculating average carboxylic acid group content per lignin macromolecule and these results are shown in table A 5.

Example B—Upscaling the Lignin Oxidation in Ammonia by Hydrogen Peroxide to Pilot Scale Lignin oxidation with hydrogen peroxide is an exothermic process and even in lab-scale significant temperature increases were seen upon addition of peroxide. This is a natural concern when scaling up chemical processes since the amount of heat produced is related to dimensions in the $3^{rd}$ power (volume) whereas cooling normally only increase with dimension squared (area). In addition, due to the high viscosity of the adhesive intermediates process equipment has to be carefully selected or designed. Thus, the scale up was carefully engineered and performed in several steps.

The first scale up step was done from 1 L (lab scale) to 9 L using a professional mixer in stainless steel with very efficient mechanical mixing The scale-up resulted only in a slightly higher end temperature than obtained in lab scale, which was attributed to efficient air cooling of the reactor and slow addition of hydrogen peroxide The next scale up step was done in a closed 200 L reactor with efficient water jacket and an efficient propeller stirrer. The scale was this time 180 L and hydrogen peroxide was added in two steps with appr. 30 minute separation. This up-scaling went relatively well, though quite some foaming was an issue partly due to the high degree reactor filling. To control the foaming a small amount of food grade defoamer was sprayed on to the foam. Most importantly the temperature controllable and end temperatures below 70° C. were obtained using external water-cooling.

The pilot scale reactions were performed in an 800 L reactor with a water cooling jacket and a twin blade propeller stirring. 158 kg of lignin (UPM LignoBoost™ BioPiva 100) with a dry-matter content of 67 wt.-% was de-lumped and suspended in 224 kg of water and stirred to form a homogenous suspension. With continued stirring 103 kg of 25% ammonia in water was pumped into the reactor and stirred another 2 hours to from a dark viscous solution of lignin.

To the stirred lignin solution 140 kg of 7.5 wt.-% at 20-25° C. hydrogen peroxide was added over 15 minutes. Temperature and foam level was carefully monitored during and after the addition of hydrogen peroxide and cooling water was added to the cooling jacket in order to maintain an acceptable foam level and a temperature rise less than 4° C. per minute as well as a final temperature below 70° C. After the temperature increase had stopped, cooling was turned off and the product mixture was stirred for another 2 hours before transferring to transport container.

Based on the scale up runs it could be concluded that even though the reactions are exothermic a large part of the reaction heat is actually balanced out by the heat capacity of the water going from room temperature to about 60° C., and only the last part has to be removed by cooling. It should be noted that due to this and due to the short reaction time this process would be ideal for a scale up and process intensification using continuous reactors such as in-line mixers, tubular reactors or CSTR type reactors. This would ensure good temperature control and a more well-defined reaction process.

Tests of the scale up batches indicated the produced oxidized lignin had properties in accordance to the batches produced in the lab.

TABLE A 1.1

The amounts of materials used in their supplied form:

| material | wt.-% |
|---|---|
| UPM BioPiva 100, kraft lignin | 28 |
| H$_2$O$_2$, 30 wt.-% solution in water | 6.6 |
| NH$_3$, 25 wt.-%, aqueous solution | 16 |
| water | 49.4 |

TABLE A 1.2

The amounts of active material used:

| material | wt.-% |
|---|---|
| kraft lignin | 19 |
| H$_2$O$_2$ | 2 |
| NH$_3$ | 4 |
| water | 75 |

TABLE A 2

Elemental analysis of kraft lignin before and after oxidation:

| sample | N (wt.-%) | C (wt.-%) | H (wt.-%) | S (wt.-%) |
|---|---|---|---|---|
| kraft lignin | 0.1 | 64.9 | 5.8 | 1.7 |
| ammonia oxidized kraft lignin | 1.6 | 65.5 | 5.7 | 1.6 |

TABLE A 3

Kraft lignin functional group distribution before and after oxidation obtained by $^{31}$P-NMR:

| | Concentration (mmol/g) | | |
|---|---|---|---|
| sample | Aliphatic OH | Phenolic OH | Acid OH |
| kraft lignin | 1.60 | 3.20 | 0.46 |
| ammonia oxidized kraft lignin | 2.11 | 3.60 | 0.80 |

TABLE A 4

COOH group content in mmol/g as determined by aqueous titration:

| sample | COOH groups (mmol/g) |
|---|---|
| kraft lignin | 0.5 |
| ammonia oxidized kraft lignin | 0.9 |

TABLE A 5

Number (Mn) and weight (Mw) average molar masses as determined by size exclusion chromatograph expressed in g/mol together with average carboxylic acid group content per lignin macromolecule before and after oxidation

| sample | Mn, g/mol | Mw, g/mol | average COOH functionality |
|---|---|---|---|
| kraft lignin | 1968 | 21105 | 0.9 |
| ammonia oxidized kraft lignin | 2503 | 34503 | 2.0 |

The invention claimed is:

1. A mineral fiber product, wherein the product comprises mineral fibers in contact with a binder resulting from curing an aqueous binder composition which comprises:
   a component (i) in the form of one or more oxidized lignins;
   a component (ii) in the form of one or more cross-linkers;
   a component (iii) in the form of one or more plasticizers.

2. The mineral fiber product of claim 1, wherein component (i) is in the form of one or more oxidized lignins, the lignins being selected from kraft lignins, soda lignins, lignosulfonate lignins, organosolv lignins, lignins from biorefining processes of lignocellulosic feedstocks, or any mixture thereof.

3. The mineral fiber product of claim 1, wherein component (i) is in the form of one or more oxidized kraft lignins.

4. The mineral fiber product of claim 1, wherein component (i) is in the form of one or more oxidized soda lignins.

5. The mineral fiber product of claim 1, wherein component (i) is in the form of one or more ammonia-oxidized lignins.

6. The mineral fiber product of claim 5, wherein the ammonia-oxidized lignin comprises one or more compounds selected from ammonia, amines, or any salts thereof.

7. The mineral fiber product of claim 1, wherein component (i) has a carboxylic acid group content of from 0.05 to 10 mmol/g, based on a dry weight of component (i).

8. The mineral fiber product of claim 1, wherein component (i) has an average carboxylic acid group content of more than 1.5 groups per macromolecule of component (i).

9. The mineral fiber product of claim 1, wherein component (ii) is in the form of one or more cross-linkers selected from β-hydroxyalkylamide-cross-linkers and oxazoline-cross-linkers.

10. The mineral fiber product of claim 1, wherein component (ii) comprises one or more cross-linkers selected from multifunctional organic amines.

11. The mineral fiber product of claim 1, wherein component (ii) comprises one or more flexible oligomers or polymers or an epoxidized oil based on a fatty acid triglyceride.

12. The mineral fiber product of claim 1, wherein component (ii) comprises a molecule having 3 or more epoxy groups.

13. The mineral fiber product of claim 1, wherein component (ii) is present in a concentration of from 1 to 40 wt.-%, based on a dry weight of component (i).

14. The mineral fiber product of claim 1, wherein component (iii) comprises one or more plasticizers selected from polyethylene glycols, polyethylene glycol ethers, polyethers, hydrogenated sugars, phthalates and/or acids, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups.

15. The mineral fiber product of claim 1, wherein component (iii) comprises one or more plasticizers having a boiling point of from 100° C. to 280° C.

16. The mineral fiber product of claim 1, wherein component (iii) comprises one or more polyethylene glycols having an average molecular weight of from 150 to 50,000 g/mol.

17. The mineral fiber product of claim 1, wherein component (iii) is present in a concentration of from 0.5 to 50 wt.-%, based on a dry weight of component (i).

18. The mineral fiber product of claim 1, wherein the binder composition consists essentially of
a component (i) in the form of one or more oxidized lignins;
a component (ii) in the form of one or more cross-linkers;
a component (iii) in the form of one or more plasticizers;
a component (iv) in the form of one or more coupling agents;
optionally a component in the form of one or more compounds selected from ammonia, amines, or any salts thereof;
optionally a component in the form of urea;
optionally a component in the form of one or more reactive or non-reactive silicones;
optionally a hydrocarbon oil;
optionally one or more surface active agents;
water.

19. A method of producing a bonded mineral fiber product, wherein the method comprises contacting mineral fibers with an aqueous binder composition and curing the binder composition, the binder composition comprising:
a component (i) in the form of one or more oxidized lignins;
a component (ii) in the form of one or more cross-linkers;
a component (iii) in the form of one or more plasticizers.

20. An aqueous binder composition, wherein the composition in its cured state is capable of binding mineral fibers to afford a bonded mineral fiber product, and comprises:
a component (i) in the form of one or more oxidized lignins;
a component (ii) in the form of one or more cross-linkers;
a component (iii) in the form of one or more plasticizers.

21. The mineral fiber product of claim 1, wherein component (iii) comprises one or more polyethylene glycols.

22. The mineral fiber product of claim 1, wherein component (i) is in the form of one or more oxidized lignins, the lignins being selected from kraft lignins, soda lignins, organosolv lignins, lignins from Biorefining processes of lignocellulosic feedstocks, or any mixture thereof.

23. The mineral fiber product of claim 1, wherein component (ii) is in the form of one or more cross-linkers selected from β-hydroxyalkylamide-cross-linkers and/or oxazoline-cross-linkers, one or more flexible oligomers or polymers, an epoxidized oil based on a fatty acid triglyceride, and a molecule having 3 or more epoxy groups, and component (iii) is in the form of one or more plasticizers comprising one or more polyethylene glycols.

24. The mineral fiber product of claim 23, wherein component (iii) comprises one or more polyethylene glycols having an average molecular weight of 150 to 50,000 g/mol.

25. The mineral fiber product of claim 23, wherein component (ii) is in the form of one or more cross-linkers selected from β-hydroxyalkylamide-cross-linkers and/or oxazoline-cross-linkers.

26. The mineral fiber product of claim 23, wherein component (i) is in the form of one or more oxidized lignins, the lignins being selected from kraft lignins, soda lignins, organosolv lignins, lignins from Biorefining processes of lignocellulosic feedstocks, or any mixture thereof.

27. The mineral fiber product of claim 23, wherein component (i) is in the form of one or more oxidized kraft lignins or one or more oxidized soda lignins.

28. The mineral fiber product of claim 1, wherein component (ii) is in the form of one or more cross-linkers selected from β-hydroxyalkylamide-cross-linkers and/or oxazoline-cross-linkers, and component (iii) is in the form of one or more plasticizers comprising one or more polyethylene glycols having an average molecular weight of 150 to 50,000 g/mol.

* * * * *